United States Patent
Liang et al.

(10) Patent No.: US 12,250,473 B2
(45) Date of Patent: Mar. 11, 2025

(54) METHOD AND SYSTEM OF SWEPT CODED APERTURE REAL-TIME FEMTOPHOTOGRAPHY

(71) Applicant: INSTITUT NATIONAL DE LA RECHERCHE SCIENTIFIQUE490, Quebec (CA)

(72) Inventors: Jinyang Liang, Boucherville (CA); François Légaré, Saint-Eustache (CA); Jingdan Liu, Longueuil (CA); Heide Ibrahim, Montreal (CA); Xianglei Liu, Longueuil (CA); Yingming Lai, Longueuil (CA)

(73) Assignee: INSTITUT NATIONAL DE LA RECHERCHE SCIENTIFIQUE, Quebec (CA)

( * ) Notice: Subject to any disclaimer, the term of this patent is extended or adjusted under 35 U.S.C. 154(b) by 131 days.

(21) Appl. No.: 18/170,887

(22) Filed: Feb. 17, 2023

(65) Prior Publication Data
US 2023/0283917 A1   Sep. 7, 2023

Related U.S. Application Data

(60) Provisional application No. 63/268,938, filed on Mar. 7, 2022.

(51) Int. Cl.
*H04N 23/95* (2023.01)
*H04N 23/12* (2023.01)
*H04N 23/56* (2023.01)

(52) U.S. Cl.
CPC ............. *H04N 23/95* (2023.01); *H04N 23/12* (2023.01); *H04N 23/56* (2023.01)

(58) Field of Classification Search
CPC ......... G01S 17/894; G01S 17/90; G01S 17/89
See application file for complete search history.

(56) References Cited

U.S. PATENT DOCUMENTS 5,969,334 A * 10/1999 Hutchin ............. G01B 9/02097
                                                                348/135
6,797,057 B1 * 9/2004 Amos .................... B82Y 20/00
                                                                117/70

(Continued)

OTHER PUBLICATIONS

Morimoto, K., Wu, M.-L., Ardelean, A. & Charbon, E. Superluminal motion-assisted four-dimensional light-in-flight maging. Phys. Rev. X 11, 011005 (2021).

(Continued)

*Primary Examiner* — Chiawei Chen
(74) *Attorney, Agent, or Firm* — Lavery, de Billy, L.L.P.; Gwendoline Bruneau

(57) ABSTRACT

A method and a system for imaging a dynamic scene, by time-spectrum mapping when a single chirped pulse probes the dynamic scene, storing temporal information at different wavelengths, spectral shearing, spatial encoding and reverse spectral shearing; spatiotemporal integration; and image reconstruction from a resulting captured snapshot, using a laser source configured to emit a linearly chirped laser probe pulse; an imaging unit; a shearing and reversing shearing unit; an encoder; a detector; and a computer; wherein the imaging unit is configured to record the linearly chirped laser probe pulse transmitted by the dynamic scene in a snapshot; the shearing and reversing shearing unit is configured to spectrally shears the linearly chirped laser pulses received from the imaging unit to the encoder, the detector records a compressed snapshot of a temporal information of the dynamic scene read out by the probe pulse; and the computer processes the snapshot and yields a(x,y,t) datacube of the dynamic scene.

15 Claims, 22 Drawing Sheets

(56) References Cited

U.S. PATENT DOCUMENTS

| | | | | |
|---|---|---|---|---|
| 7,280,186 | B1* | 10/2007 | Ionov | G01S 17/34 |
| | | | | 356/5.15 |
| 7,652,765 | B1* | 1/2010 | Geshwind | G01J 3/2823 |
| | | | | 356/330 |
| 8,213,022 | B1* | 7/2012 | Riza | G01B 11/026 |
| | | | | 359/290 |
| 9,894,254 | B2* | 2/2018 | Heshmat Dehkordi | |
| | | | | H04N 23/57 |
| 10,061,028 | B2* | 8/2018 | Koppal | G01S 17/894 |
| 10,274,377 | B1* | 4/2019 | Rabb | G01S 17/90 |
| 10,473,916 | B2* | 11/2019 | Wang | G06T 1/0007 |
| 10,978,271 | B2* | 4/2021 | Liang | G01N 23/2251 |
| 11,561,134 | B2* | 1/2023 | Wang | H03M 7/3066 |
| 11,792,381 | B2* | 10/2023 | Wang | G01S 17/894 |
| | | | | 348/162 |
| 2016/0231549 | A1* | 8/2016 | Bosworth | G02B 21/0032 |
| 2017/0163971 | A1* | 6/2017 | Wang | G06T 1/0007 |
| 2018/0224552 | A1* | 8/2018 | Wang | H04N 19/593 |
| 2019/0154834 | A1* | 5/2019 | Heidrich | G01S 17/89 |
| 2020/0158568 | A1* | 5/2020 | Kasim | G01J 3/0208 |
| 2020/0161084 | A1* | 5/2020 | Liang | H01J 37/26 |
| 2021/0166124 | A1* | 6/2021 | Schäfer | G06N 3/08 |
| 2022/0247908 | A1* | 8/2022 | Wang | H04N 13/161 |

OTHER PUBLICATIONS

Nakagawa, K. et al. Sequentially timed all-optical mapping photography (STAMP). Nat. Photonics 8, 695-700 (2014).

Ohl, C.-D. & Wolfrum, B. Detachment and sonoporation of adherent HeLa-cells by shock wave-induced cavitation. Biochim. Biophys. Acta. Gen. Subj. 1624, 131-138 (2003).

Otsu, N. A threshold selection method from gray-level histograms. IEEE Trans. Syst. Man Cybern. 9, 62-66 (1979).

Pfau, B. et al. Ultrafast optical demagnetization manipulates nanoscale spin structure in domain walls. Nat. Commun. 3, 1-6 (2012).

Purwar, H., Idlahcen, S., Rozé, C., Sedarsky, D. & Blaisot, J.-B. Collinear, two-color optical Kerr effect shutter for ultrafast time-resolved imaging. Opt. Express 22, 15778-15790 (2014).

Qi, D. et al. Single-shot compressed ultrafast photography: a review. Adv. Photonics 2, 014003 (2020).

Qiao, M., Liu, X. & Yuan, X. Snapshot temporal compressive microscopy using an iterative algorithm with untrained neural networks. Opt. Lett. 46, 1888-1891 (2021).

Raskar, R., Agrawal, A. & Tumblin, J. Coded exposure photography: motion deblurring using fluttered shutter. ACM Trans. Graph. 25, 795-804 (2006).

Reddy, D., Veeraraghavan, A. & Chellappa, R. P2C2: Programmable pixel compressive camera for high speed maging in CVPR 2011. 329-336 (IEEE).

Savage, N. Supercontinuum sources. Nat. Photonics 3, 114-115 (2009).

Schmidt, B. E. et al. Frequency domain optical parametric amplification. Nat. Commun. 5, 3643 (2014).

Shao, Z., Cao, X., Luo, H. & Jin, P. Recent progress in the phase-transition mechanism and modulation of vanadium dioxide materials. NPG Asia Mater. 10, 581-605 (2018).

Suzuki et al., Sequentially timed all-optical mapping photography (STAMP) utilizing spectral filtering, Optics Express, vol. 23, No. 23, 2015.

Suzuki et al., Single-shot 25-frame burst imaging of ultrafast phase transition of Ge2Sb2Te5 with a sub-picosecond resolution, Appl. Phys. Express 10, 2017.

Suzuki, M., Sugama, Y., Kuroda, R. & Sugawa, S. Over 100 Million Frames per Second 368 Frames Global Shutter Burst CMOS Image Sensor with Pixel-wise Trench Capacitor Memory Array. Sensors 20, 1086 (2020).

Trebino, R. & Kane, D. J. Using phase retrieval to measure the intensity and phase of ultrashort pulses: frequency-resolved optical gating. J. Opt. Soc. Am. A 10, 1101-1111 (1993).

Velten, A. et al. Recovering three-dimensional shape around a corner using ultrafast time-of-flight imaging. Nat. Commun. 3, 745 (2012).

Versluis, M. High-speed imaging in fluids. Exp. Fluids 54, 1458 (2013).

Wang, X. et al. High-frame-rate observation of single femtosecond laser pulse propagation in fused silica using an echelon and optical polarigraphy technique. Appl. Opt. 53, 8395-8399 (2014).

Wang, P., Liang, J. & Wang, L. V. Single-shot ultrafast imaging attaining 70 trillion frames per second. Nat. Commun. 11, 2091 (2020).

Weiner, A. M. Ultrafast optical pulse shaping: A tutorial review. Opt. Commun. 284, 3669-3692 (2011).

Wollenhaupt, M., Assion, A. & Baumert, T., in Springer Handbook of Lasers and Optics (ed Frank Träger) 937-983 (Springer New York, 2007).

Wu, J.-L. et al. Ultrafast laser-scanning time-stretch imaging at visible wavelengths. Light Sci. Appl. 6, e16196-e16196 (2017).

Yu, Z., Gundlach, L. & Piotrowiak, P. Efficiency and temporal response of crystalline Kerr media in collinear optical Kerr gating. Opt. Lett. 36, 2904-2906 (2011).

Yuan, X., Liu, Y., Suo, J. & Dai, Q. Plug-and-play algorithms for large-scale snapshot compressive imaging in Proceedings of the IEEE/CVF Conference on Computer Vision and Pattern Recognition. 1447-1457 (2020).

Yuan, X., Brady, D. J. & Katsaggelos, A. K. Snapshot compressive imaging: Theory, algorithms, and applications. IEEE Signal Process. Mag. 38, 65-88 (2021).

Zeng, X. et al. High-spatial-resolution ultrafast framing imaging at 15 trillion frames per second by optical parametric amplification. Adv. Photonics 2, 056002 (2020).

Zhang, J., Xiong, T., Tran, T., Chin, S. & Etienne-Cummings, R. Compact all-CMOS spatiotemporal compressive sensing video camera with pixel-wise coded exposure. Opt. Express 24, 9013-9024 (2016).

Zhu, L. et al. Space- and intensity-constrained reconstruction for compressed ultrafast photography. Optica 3, 694-697 (2016).

Liang, J., Zhu, L. & Wang, L. V. Single-shot real-time femtosecond imaging of temporal focusing. Light Sci. Appl. 7, 42 (2018).

Abramson, N. Light-in-flight recording by holography. Opt. Lett. 3, 121-123 (1978).

Arai, T et al. A 252-V/lux.s, 16.7-Million-Frames-Per-Second 312-kpixel Back-Side-Illuminated Ultrahigh-Speed Charge-Coupled Device. IEEE Trans. Electron Devices 60, 3450-3458 (2013).

Artusi, A., Richter, T., Ebrahimi, T. & Mantiuk, R. K. High dynamic range imaging technology [lecture notes]. IEEE Signal Process. Mag. 34, 165-172 (2017).

Becker, W., Shcheslavkiy, V., Frere, S. & Slutsky, I. Spatially resolved recording of transient fluorescence-lifetime effects by line-scanning TCSPC. Microsc Res Tech. 77, 216-224 (2014).

Berezin, M. Y. & Achilefu, S. Fluorescence Lifetime Measurements and Biological Imaging. Chem. Rev. 110, 2641-2684 (2010).

Boyd, S., Parikh, N. & Chu, E. Distributed optimization and statistical learning via the alternating direction method of multipliers. (Now Publishers Inc, 2011).

Burger, H. C., Schuler, C. J. & Harmeling, S. Image denoising: Can plain neural networks compete with BM3D? in 2012 IEEE conference on computer vision and pattern recognition. 2392-2399 (IEEE).

Candes, E. J. & Wakin, M. B. An Introduction To Compressive Sampling. IEEE Signal Process. Mag. 25, 21-30 (2008).

Chan, S. H., Wang, X. & Elgendy, O. A. Plug-and-play ADMM for image restoration: Fixed-point convergence and applications. IEEE Trans. Comput. Imag. 3, 84-98 (2016).

Chichkov, B. N., Momma, C., Nolte, S., Von Alvensleben, F. & Tunnermann, A. Femtosecond, picosecond and hanosecond laser ablation of solids. Appl. Phys. A 63, 109-115 (1996).

Cohen, R., Elad, M. & Milanfar, P. Regularization by denoising via fixed-point projection (RED-PRO). SIAM J. Imaging Sci. 14, 1374-1406 (2021).

Dabov, K., Foi, A., Katkovnik, V. & Egiazarian, K. Image denoising by sparse 3-D transform-domain collaborative filtering. IEEE Trans. Image Process. 16, 2080-2095 (2007).

(56) References Cited

OTHER PUBLICATIONS

Danielyan, A., Katkovnik, V. & Egiazarian, K. BM3D frames and variational image deblurring. IEEE Trans. Image Process. 21, 1715-1728 (2012).
Das, S., Wang, Y., Dai, Y., Li, S. & Sun, Z. Ultrafast transient sub-bandgap absorption of monolayer MoS2. Light Sci. Appl. 10, 27 (2021).
Diels, J.-C. & Rudolph, W. Ultrashort laser pulse phenomena. (Elsevier, 2006).
Etoh, T. G. et al. The theoretical highest frame rate of silicon image sensors. Sensors 17, 483 (2017).
Faccio, D. & Velten, A. A trillion frames per second: the techniques and applications of light-in-flight photography. Rep. Prog. Phys. 81, 105901 (2018).
Fan, L., Yan, X., Wang, H. & Wang, L. V. Real-time observation and control of optical chaos. Sci. Adv. 7, eabc8448 (2021).
Feng, W., Zhang, F., Qu, X. & Zheng, S. Per-pixel coded exposure for high-speed and high-resolution imaging using a digital micromirror device camera. Sensors 16, 331 (2016).
Feurer, T., Vaughan, J. C. & Nelson, K. A. Spatiotemporal coherent control of lattice vibrational waves. Science 299, 374-377 (2003).
Fieramonti, L. et al. Time-gated optical projection tomography allows visualization of adult zebrafish internal structures. PLoS One 7, e50744 (2012).
Gao, L., Liang, J., Li, C. & Wang, L. V. Single-shot compressed ultrafast photography at one hundred billion frames per second. Nature 516, 74-77 (2014).
Gariepy, G. et al. Single-photon sensitive light-in-flight imaging. Nat. Commun. 6, 6021 (2015).
Goda, K., Tsia, K. & Jalali, B. Serial time-encoded amplified imaging for real-time observation of fast dynamic phenomena. Nature 458, 1145-1149 (2009).
Guizar-Sicairos, M., Thurman, S. T. & Fienup, J. R. Efficient subpixel image registration algorithms. Opt. Lett. 33, 156-158 (2008).
Hashimoto, Y. et al. Ultrafast time-resolved magneto-optical imaging of all-optical switching in GdFeCo with femtosecond time-resolution and a μm spatial-resolution. Rev. Sci. Instrum. 85, 063702 (2014).
Hennecke, M. et al. Angular momentum flow during ultrafast demagnetization of a ferrimagnet. Phys. Rev. Lett. 122, 157202 (2019).
Hennes, M. et al. Laser-induced ultrafast demagnetization and perpendicular magnetic anisotropy reduction in a Co 88 Tb 12 thin film with stripe domains. Phys. Rev. B 102, 174437 (2020).
Hitomi, Y., Gu, J., Gupta, M., Mitsunaga, T. & Nayar, S. K. Video from a single coded exposure photograph using a earned overcomplete dictionary in 2011 International Conference on Computer Vision. 287-294 (IEEE).
Hu, C., Huang, H., Chen, M., Yang, S. & Chen, H. Video object detection from one single image through opto-electronic neural network. APL Photonics 6, 046104 (2021).
Kane, D. J. & Trebino, R. Characterization of arbitrary femtosecond pulses using frequency-resolved optical gating. IEEE J. Quantum Electron. 29, 571-579 (1993).
Kimel, A. V. & Li, M. Writing magnetic memory with ultrashort light pulses. Nat. Rev. Mater. 4, 189-200 (2019).
Kodama, R. I. et al. Fast heating of ultrahigh-density plasma as a step towards laser fusion ignition. Nature 412, 798 (2001).
Koller, R. et al. High spatio-temporal resolution video with compressed sensing. Opt. Express 23, 15992-16007 (2015).
Lai, Y. et al. Single-Shot Ultraviolet Compressed Ultrafast Photography. Laser Photonics Rev. 14, 2000122 (2020).
Lassonde, P. et al. Information transfer via temporal convolution in nonlinear optics. Sci. Rep. 10, 14969 (2020).
Leblanc, A. et al. Phase-matching-free pulse retrieval based on transient absorption in solids. Opt. Express 27, 28998-29015 (2019).
Lei, C., Guo, B., Cheng, Z. & Goda, K. Optical time-stretch imaging: Principles and applications. Appl. Phys. Rev. 3, 011102 (2016).
Liang et al., Single-shot real-time video recording of a photonic Mach cone induced by a scattered light pulse, Optics Express, 2015. 23(23): p. 30512-30522; Applied Physics Express, 2017.
Liang, J. Punching holes in light: recent progress in single-shot coded-aperture optical imaging. Rep. Prog. Phys. 83, 116101 (2020).
Liang, J. & Wang, L. V., in Handbook of Laser Technology and Applications (eds Chunlei Guo & Subhash Chandra Singh) Ch. 26, (CRC Press, 2021).
Liu, X. et al. Dynamics of magnetization, reversal, and ultrafast demagnetization of TbFeCo amorphous films. Appl. Phys. Lett. 92, 232501 (2008).
Liu, D. et al. Efficient space-time sampling with pixel-wise coded exposure for high-speed imaging. IEEE Trans. Pattern Anal. Mach. Intell. 36, 248-260 (2014).
Liu, X. et al. Single-shot real-time compressed ultrahigh-speed imaging enabled by a snapshot-to-video autoencoder. Photon. Res. 9, 2464-2474 (2021).
Llull, P. et al. Coded aperture compressive temporal imaging. Opt. Express 21, 10526-10545 (2013).
Lu, Y., Wong, T. T. W., Chen, F. & Wang, L. Compressed Ultrafast Spectral-Temporal Photography. Phys. Rev. Lett. 122, 193904 (2019).
Malinowski, G. et al. Control of speed and efficiency of ultrafast demagnetization by direct transfer of spin angular momentum. Nat. Phys. 4, 855-858 (2008).
Mochizuki, F. et al. Single-event transient imaging with an ultrahigh-speed temporally compressive multi-aperture CMOS image sensor. Opt. Express 24, 4155-4176 (2016).

* cited by examiner

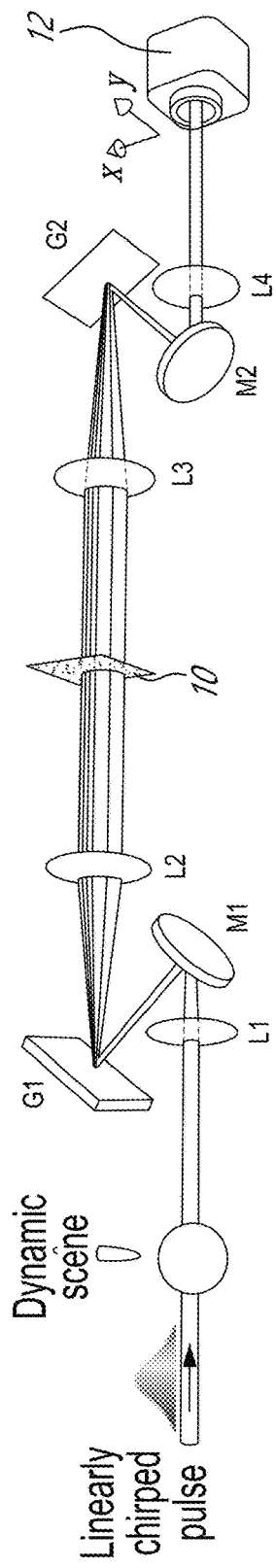
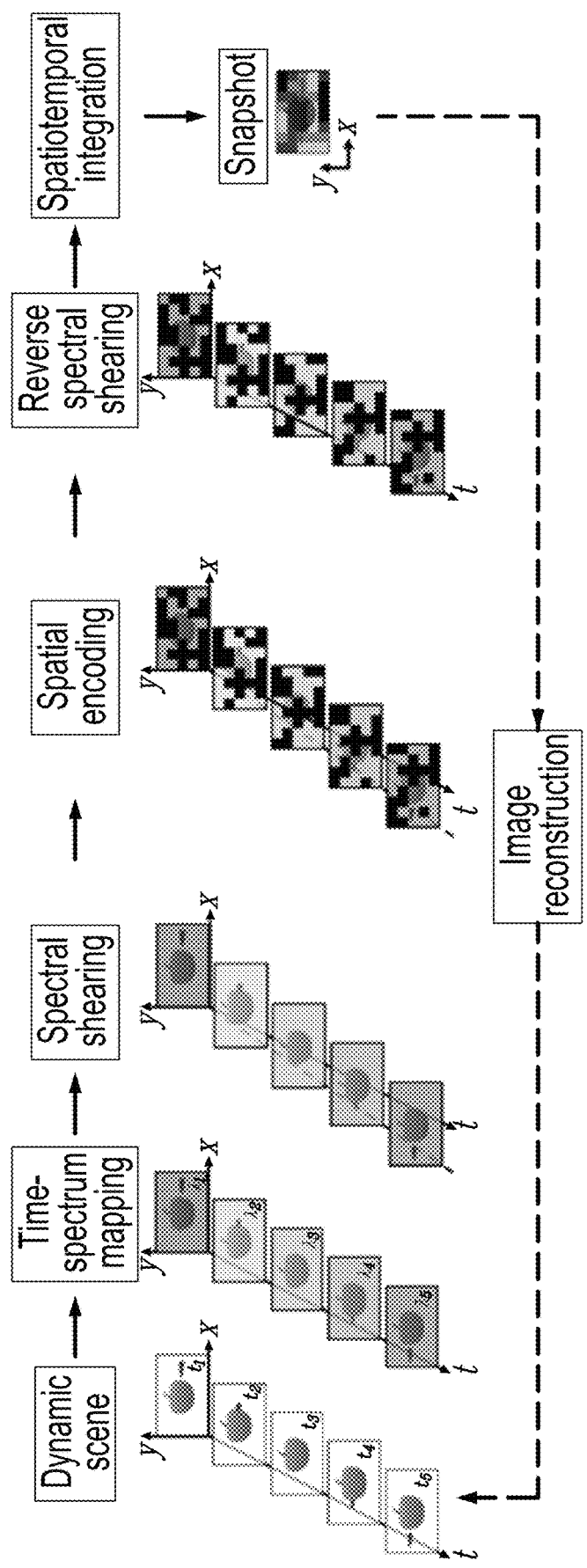
Figure 1a
Figure 1b

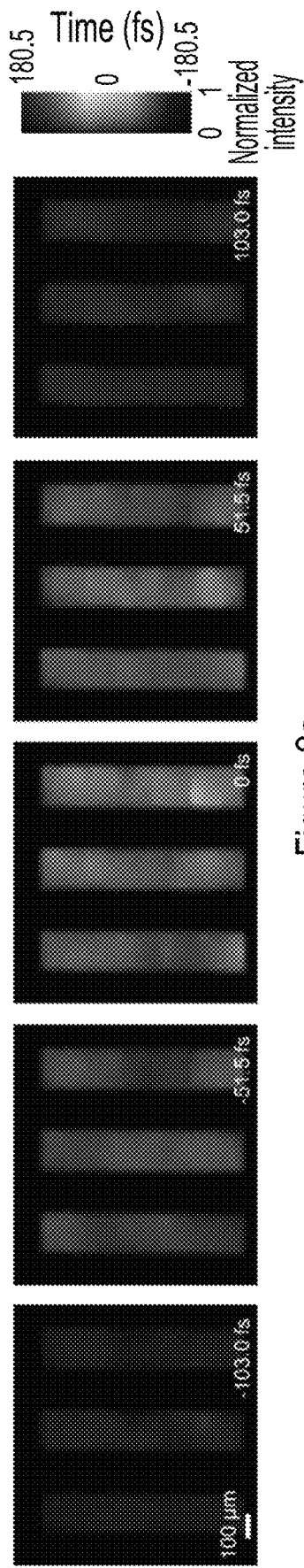
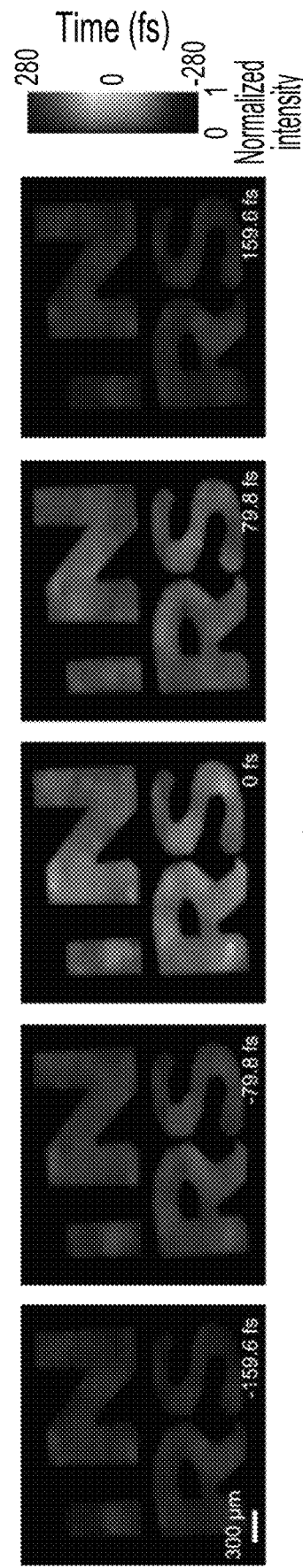
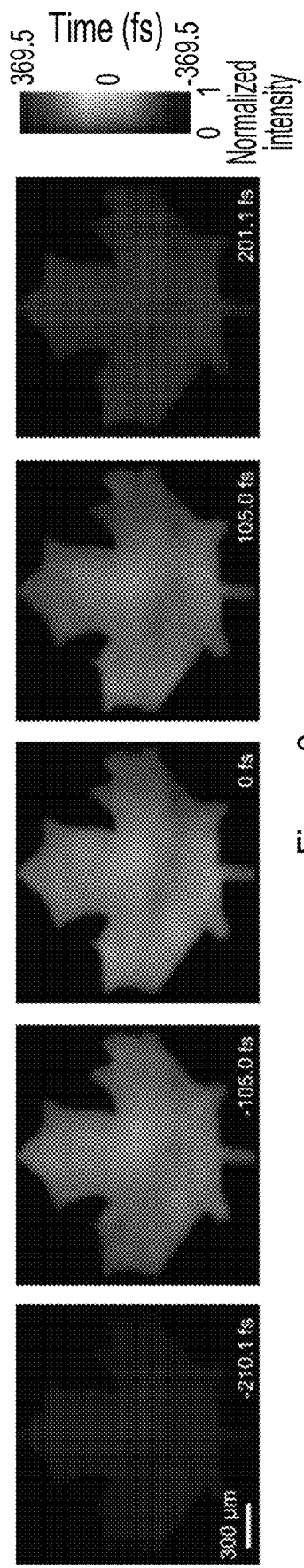
Figure 2a
Figure 2b
Figure 2c

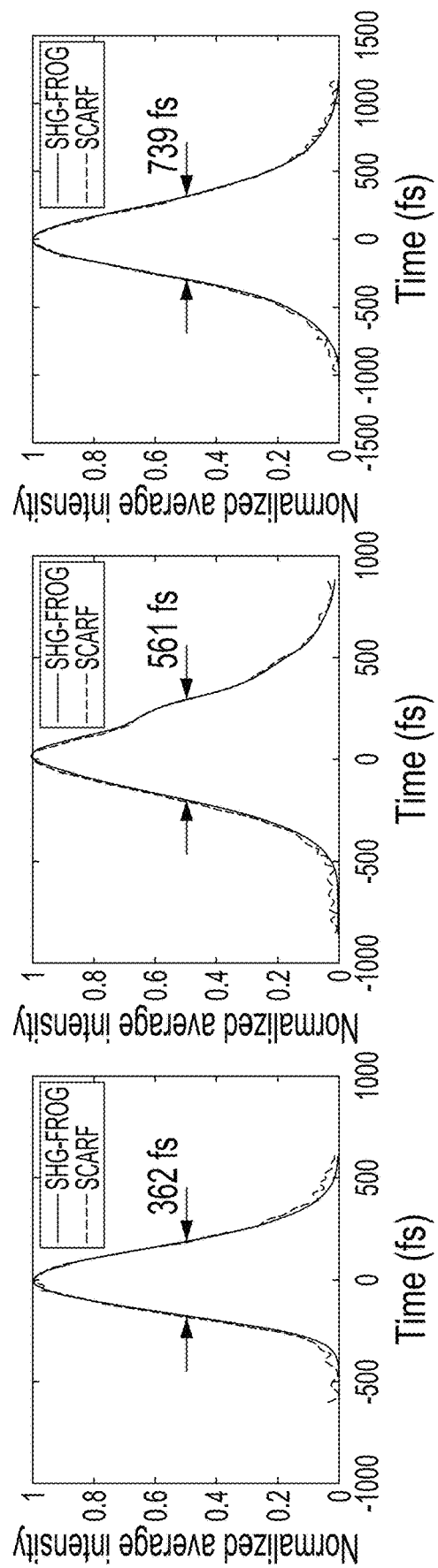

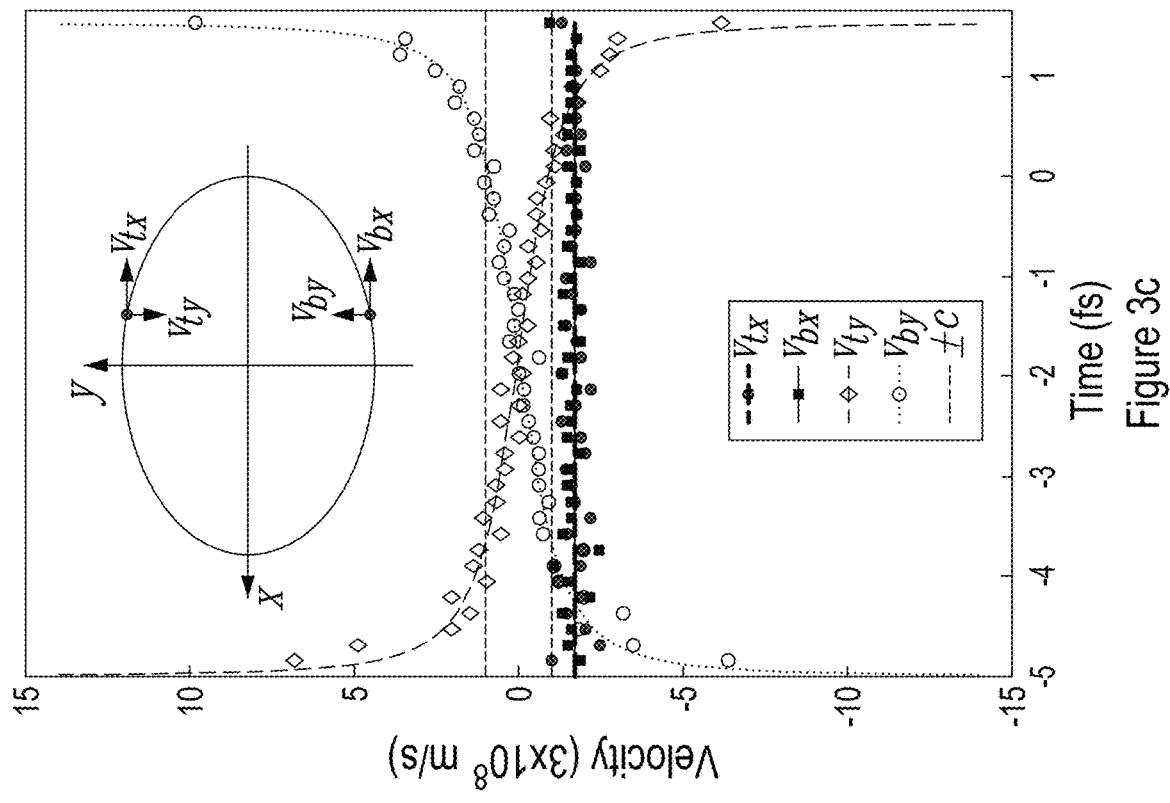
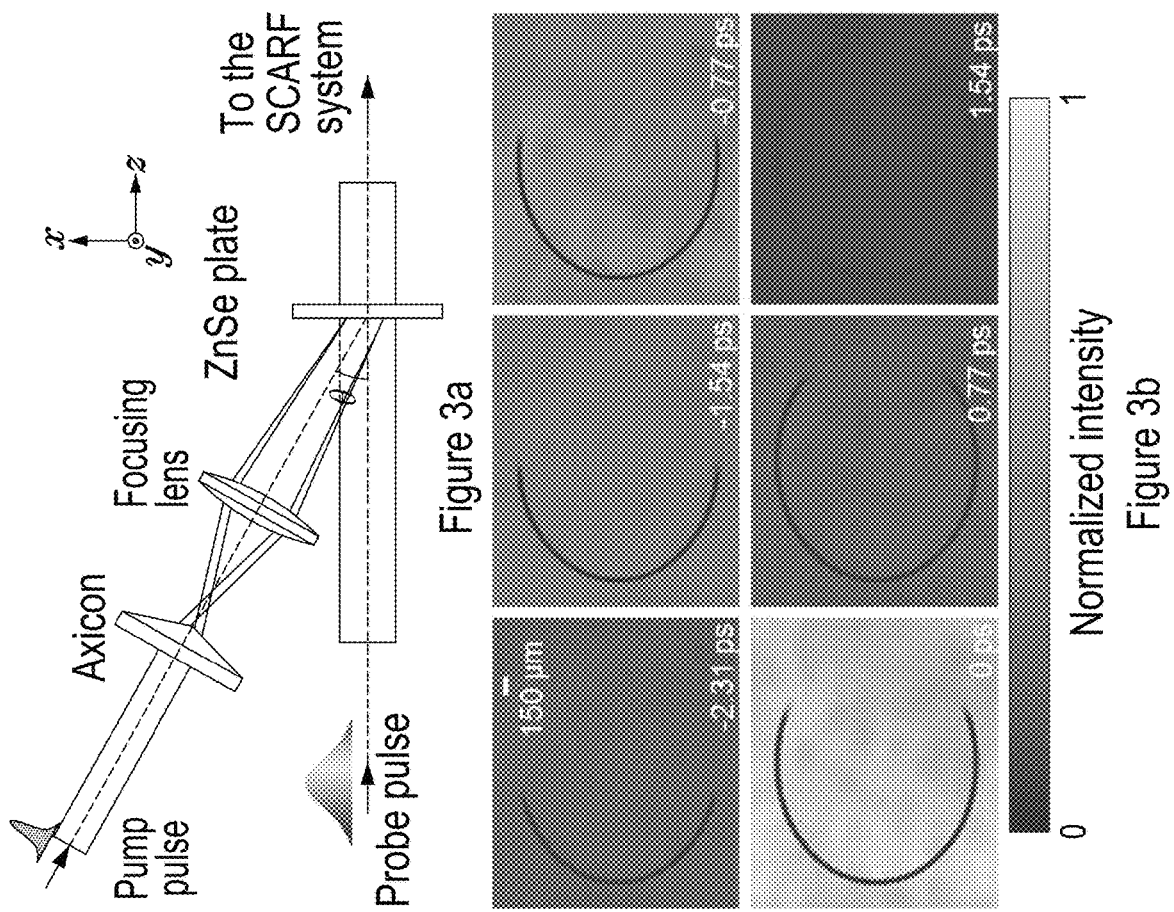
Figure 3a
Figure 3b
Figure 3c

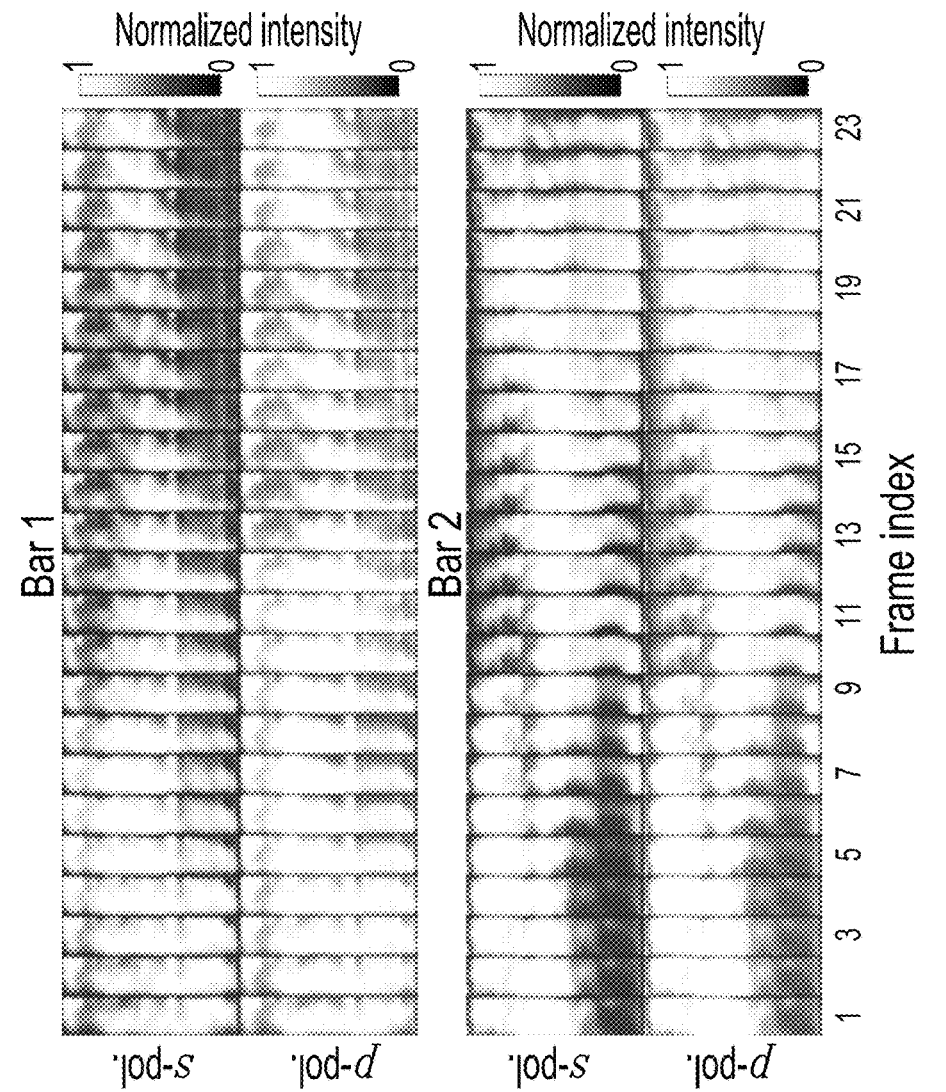
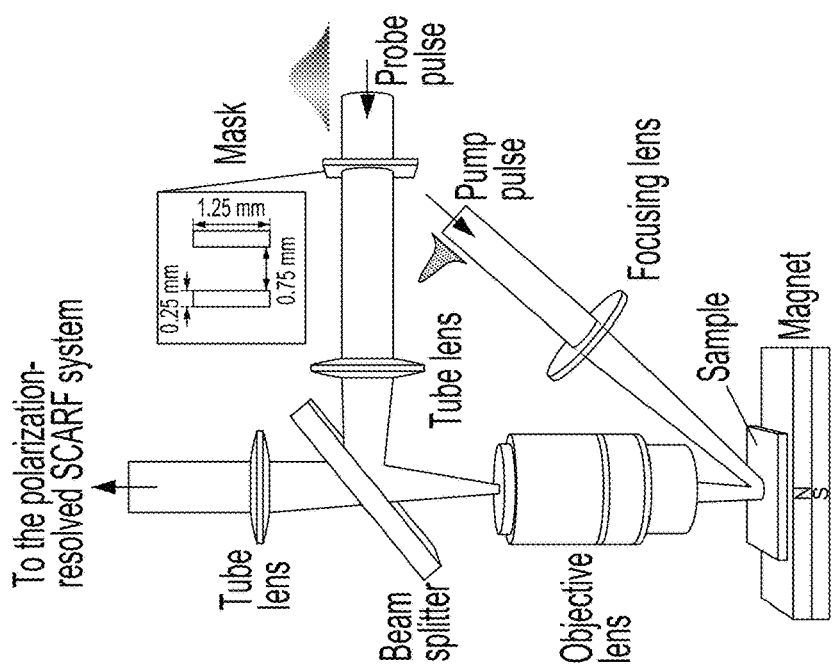
Figure 5a
Figure 5b

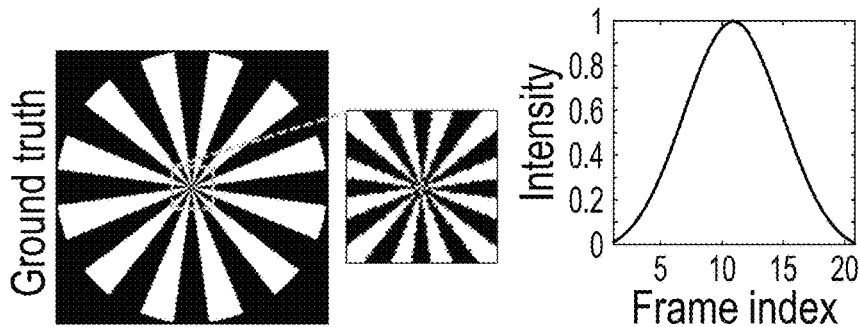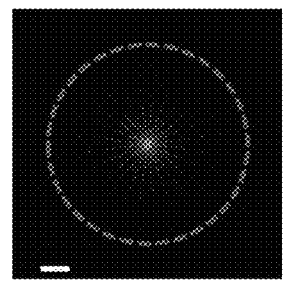
Figure 7a
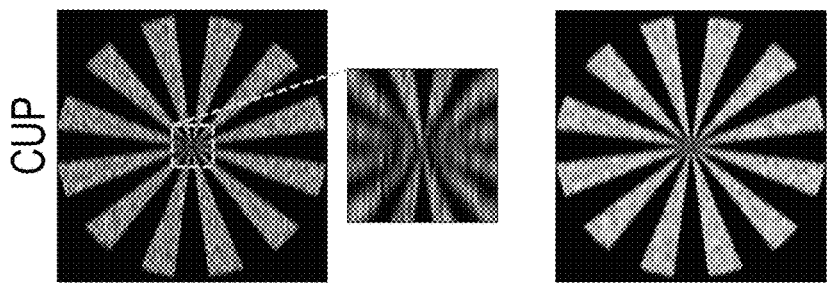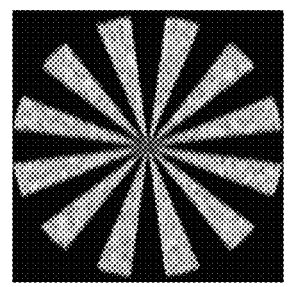
Figure 7b  Figure 7d
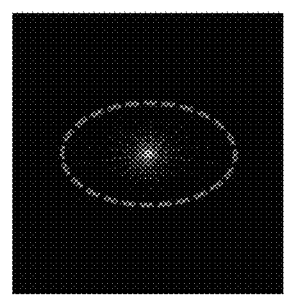
Figure 7f
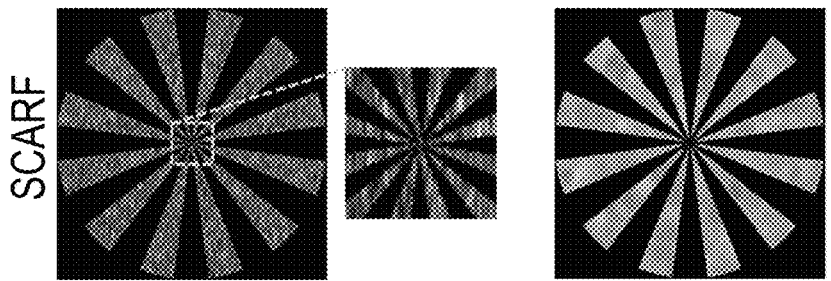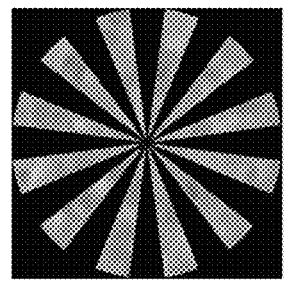
Figure 7c  Figure 7e
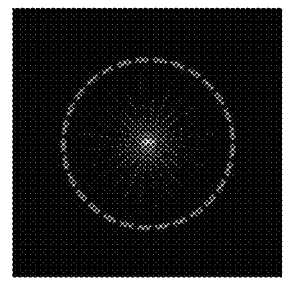
Figure 7g
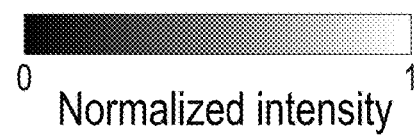
0 — Normalized intensity — 1
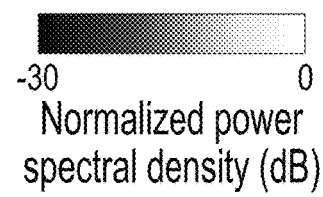
-30 — Normalized power spectral density (dB) — 0
Figure 7h

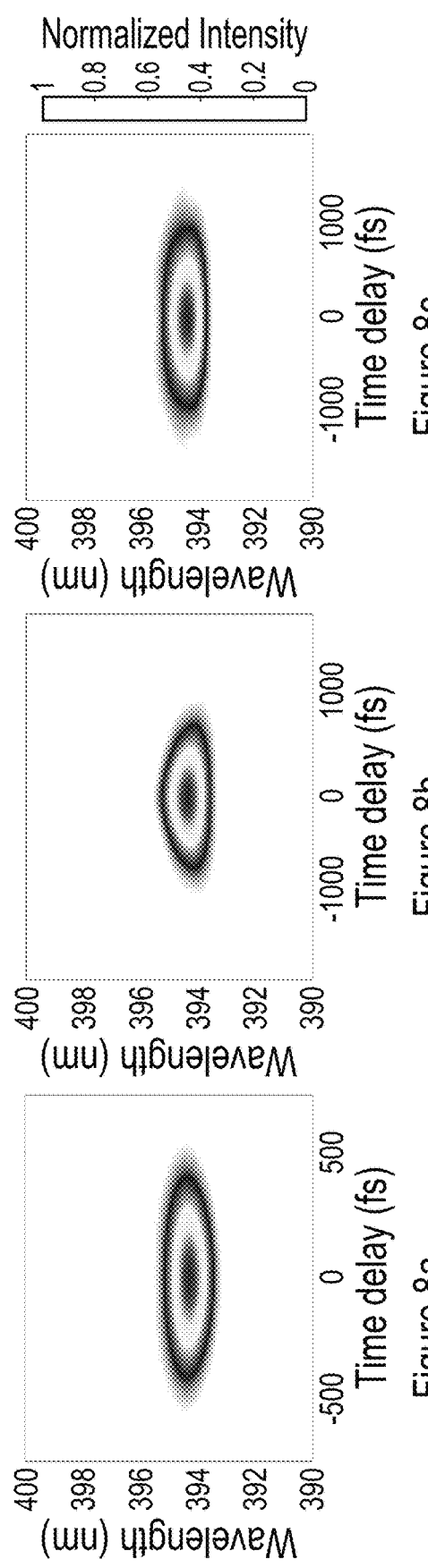
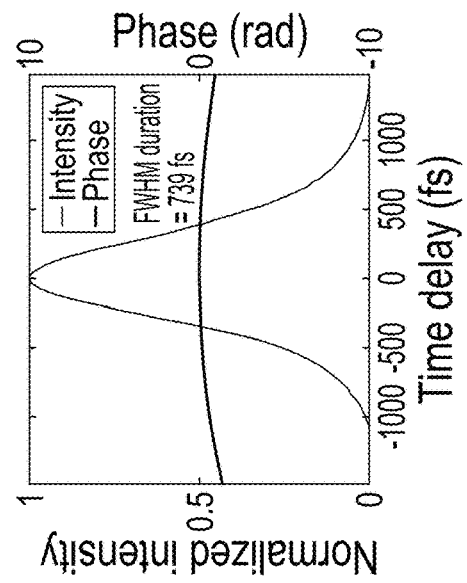
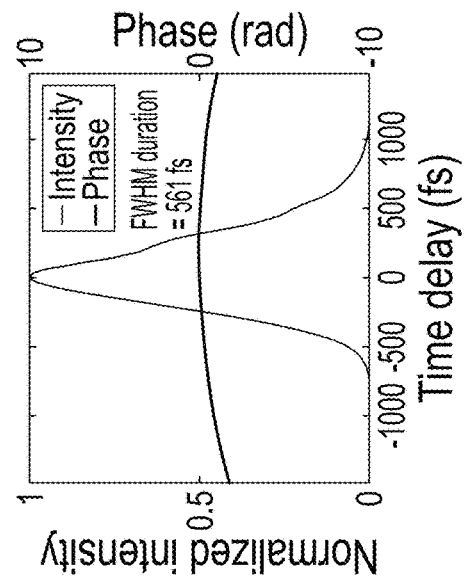
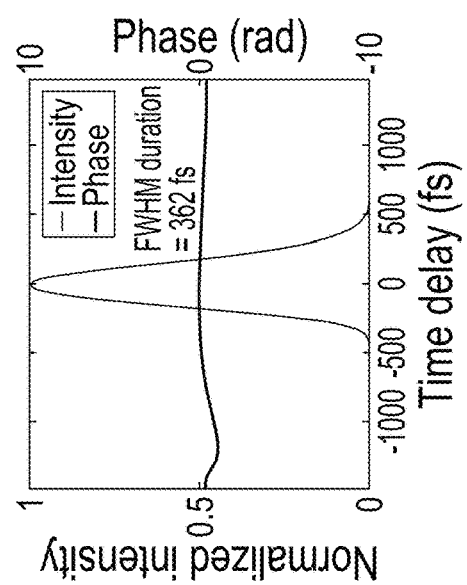
Figure 8a
Figure 8b
Figure 8c
Figure 8d
Figure 8e
Figure 8f

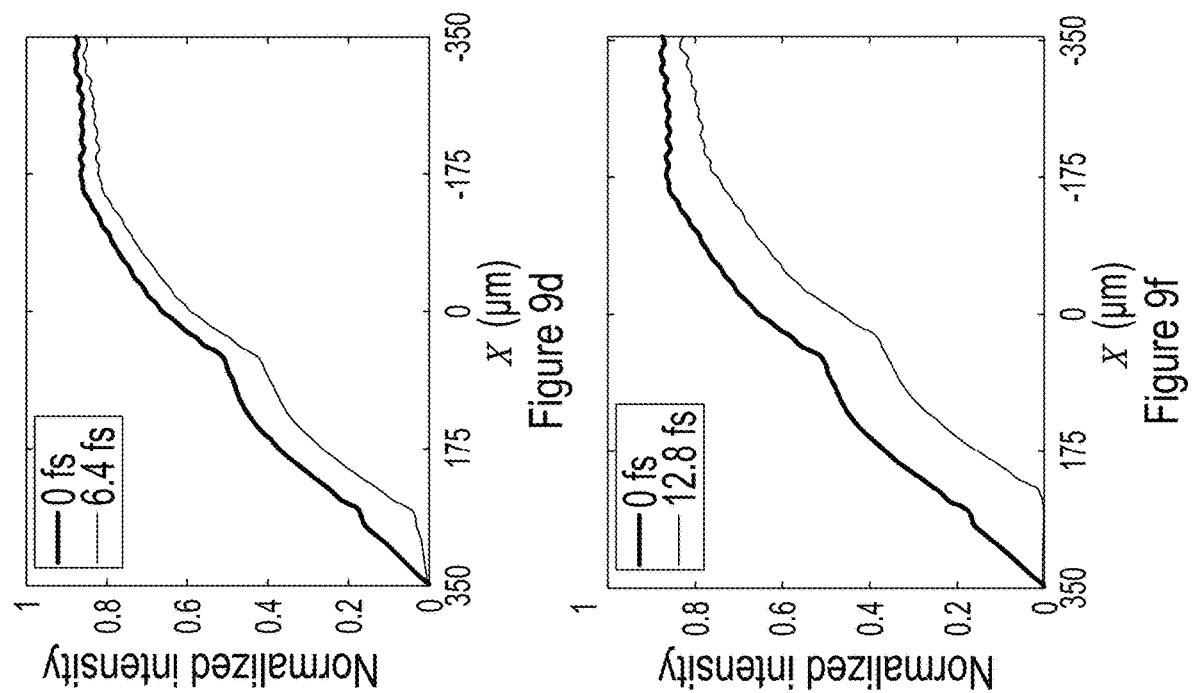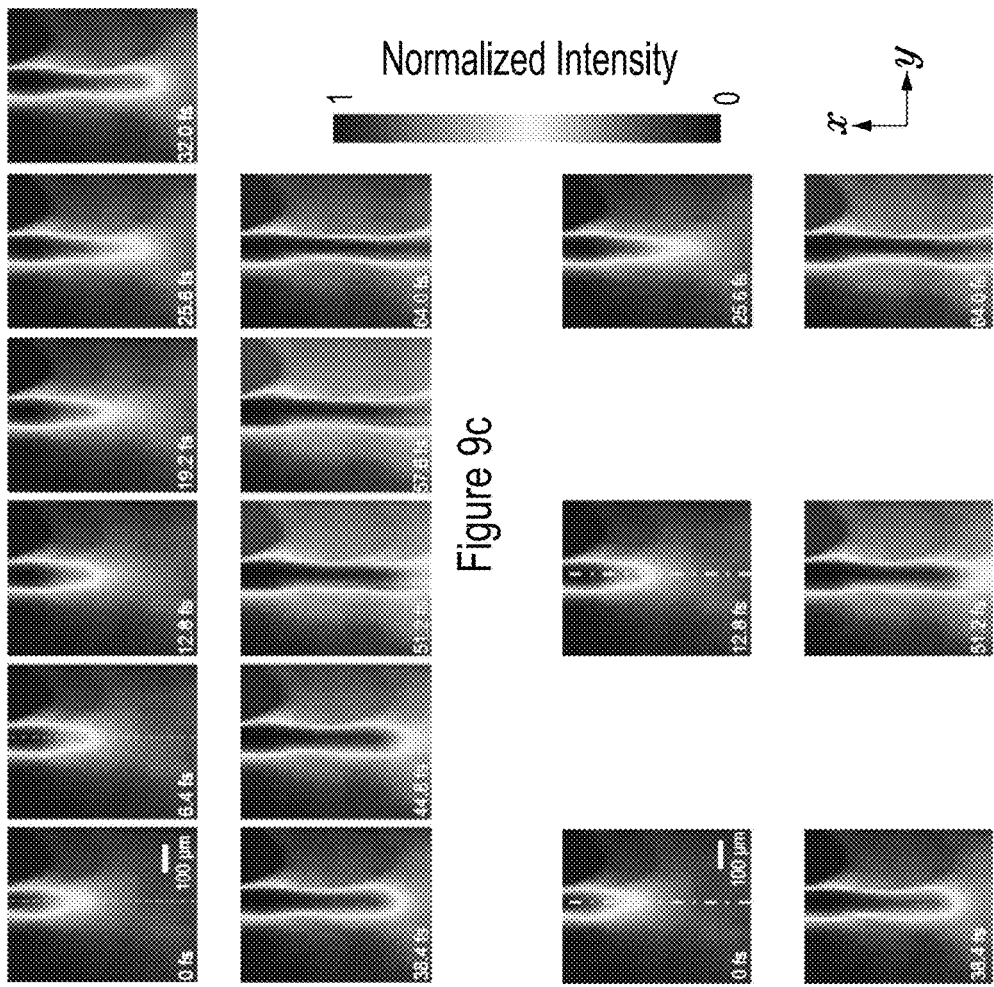

| Experiment | System parameters | Duration of the probe pulse | Bandwidth of the probe pulse | Imaging speed | Sequence depth | Pixel binning | Spatial resolution | Contrast |
|---|---|---|---|---|---|---|---|---|
| Single ultrashort pulses transmitting through transparencies | Bar pattern | 362 fs | 3.3 nm | 116.3 Tfps | 132 | 2×2 | 38.5 μm | Intensity |
| | INRS logo | 561 fs | 3.3 nm | 74.9 Tfps | 132 | 2×2 | 46.7 μm | Intensity |
| | Maple leaf | 739 fs | 3.3 nm | 56.8 Tfps | 132 | 2×2 | 41.2 μm | Intensity |
| Transient absorption in a semiconductor | | 6.5 ps | 3.3 nm | 6.5 Tfps | 42 | 2×2 | 35.7 μm | Absorption |
| | | 530 fs | 6.6 nm | 156.3 Tfps | 11 | 2×2 | 33.0 μm | Absorption |
| Dynamic birefringence in a Kerr medium | | 7.7 ps | 3.3 nm | 1.6 Tfps | 12 | 7×7 | 105.8 μm | Index of refraction |
| Ultrafast demagnetization of an alloy film | | 1.2 ps | 1.8 nm | 19.1 Tfps | 23 | 2×2 | 2.2 μm | Magnetization |

Supplementary Table 1

Figure 12

| Image modality | CUST [Supp. Ref. 19] | CUSP [Supp. Ref. 20] | CACTI [Supp. Ref. 11] | MA-CS CMOS [Supp. Ref. 18] | SCARF [This work] |
|---|---|---|---|---|---|
| Imaging speed | 3.85 Tfps | 70 Tfps | ~5 kfps | 200 Mfps | 156.3 Tfps |
| Approach to record temporal information | Mask and scene shearing | Mask and scene shearing | Mask shearing | Flutter shutter | Mask shearing |
| Approach to implement coded apertures | Single static mask | Single static mask | Single moving mask or spatial light modulator | High-bandwidth circuit | Single static mask |
| Compression ratio | $\frac{N_t}{1+\frac{N_t}{N_y}}$ | $\frac{N_t}{1+\frac{N_t}{N_y}}$ | $N_t$ | 2.1 | $N_t$ |
| Sequence depth | 60 | 140 (one sub-pulse) | 148 | 32 | 132 (at 116.3 Tfps) |
| Field of view ($N_x \times N_y$) | 340×375 | 532×512 | 248×256 | 64×108 | 1024×1024 |
| Data acquisition capability (Frames · Tfps) | 231 | 9800 | $0.74 \times 10^6$ | $6.4 \times 10^3$ | 15351.6 |

Supplementary Table 2

Figure 13

| Image modality | STAMP | SCARF [This work] |
|---|---|---|
| Schematic | | |
| Operating principle | Direct imaging | Computational reconstruction |
| Imaging speed | 65.4 Gfps – 4.4 Tfps | 1.6 Tfps – 156.3 Tfps |
| Sequence depth | 6 | 11 – 132 |
| Field of view ($N_x \times N_y$) | 450 × 450 | 1024 × 1024 |
| Applications | (1) Laser plasma<br>(2) Phonon propagation | (1) Ultrafast absorption<br>(2) Dynamic birefringence<br>(3) Ultrafast demagnetization |

Figure 14

METHOD AND SYSTEM OF SWEPT CODED APERTURE REAL-TIME FEMTOPHOTOGRAPHY

CROSS REFERENCE TO RELATED APPLICATIONS

This application claims benefit of U.S. provisional application Ser. No. 63/268,938, filed on Mar. 7, 2022. All documents above are incorporated herein in their entirety by reference.

FIELD OF THE INVENTION

The present invention relates to ultrafast imaging. More specifically, the present disclosure is concerned with a method and system of swept coded aperture real-time femtophotography.

BACKGROUND OF THE INVENTION

Ultrafast phenomena, such as nuclear fusion, photon transport in scattering media, and radiative decay of molecules for example, have timespans from femtoseconds to picoseconds. Femtophotography, which is a method for recording the propagation of ultrashort pulses of light through a scene at a very high speed, i. e. for recording (x,y) information at trillions ($10^{12}$) of frames per second (Tfps) and up to $10^{13}$ of frames per second (Tfps), is needed to clearly resolve spatiotemporal details of such phenomena. Unfortunately, the electrical operation and limited storage have significantly constrained the shutter speed and frame rate of conventional electronic-image-sensors-based cameras. Over the past decade, a number of methods have been reported to overcome these technical hurdles and achieved unprecedented frame rates, however still far beyond what can be reached with conventional image sensors. Thus far, the highest imaging speed is clamped to 10 trillion frames per second, (Tfps), which precludes single-shot imaging of many transient phenomena on the femtosecond ($10^{15}$) time scale.

Currently, femtophotography is mostly realized by using multiple-shot methods, in which, for data acquisition, each measurement captures a temporal slice by time gating, a spatiotemporal slice using ultrafast devices, or a certain number of time-stamped events using photon-counting cameras. Then, repetitive measurements, with selected auxiliaries such as temporal or spatial scanning for example, are performed to construct a time-resolved movie.

Multiple-shot methods require the dynamic events under observation to be precisely reproducible, and thus fail in case of non-repeatable or difficult-to-produce ultrafast phenomena, such as femtosecond laser ablation, shock-wave interaction with living cells, and optical chaos for example.

A number of methods may be used to achieve an imaging speed of tens of trillions frames per second, such as compressed ultrafast photography (CUP), which can achieve an imaging speed of 10 Tfps and a sequence depth of 350 frames; sequentially timed all-optical mapping photography (STAMP), and, using frequency-to-time mapping, spectrally filtered-sequentially timed all-optical mapping photography (SF-STAMP), which has achieved a 7.52-Tfps imaging speed with a sequence depth of 25 frames; compressed ultrafast spectral photography (CUSP), which achieves both $7\times10^{13}$ fps and 103 frames in active mode and provides four-dimensional (4D) spectral imaging at $0.5\times10^{12}$ fps in passive mode.

Single-shot femtophotography is indispensable to imaging numerous ultrafast dynamics during their times of occurrence. Existing methods are either strained by the trade-off between fields of view and sequence depths or limited by spatial resolution and imaging speeds.

There is still a need in the art for a method and system of femtophotography.

The present description refers to a number of documents, the content of which is herein incorporated by reference in their entirety.

SUMMARY OF THE INVENTION

More specifically, in accordance with the present invention, there is provided a method for imaging of a dynamic scene, comprising data acquisition by imaging the scene using a single chirped pulse; time-spectrum mapping when the single chirped pulse probes the dynamic scene and storing temporal information at different wavelengths, spectral shearing, spatial encoding and reverse spectral shearing; and spatiotemporal integration; and image reconstruction by processing a resulting captured snapshot by a computer; yielding an image of the dynamic scene.

There is further provided a system for imaging of a dynamic scene, the system comprising a laser source configured to emit a linearly chirped laser probe pulse; an imaging unit; a shearing and reversing shearing unit; an encoder; a detector; and a computer; wherein the imaging unit is configured to record the linearly chirped laser probe pulse transmitted by the dynamic scene in a snapshot; the shearing and reversing shearing unit is configured to spectrally shears the linearly chirped laser pulses received from the imaging unit to the encoder, the detector records a compressed snapshot of a temporal information of the dynamic scene read out by the probe pulse; and the computer processes the snapshot and yields a(x,y,t) datacube of the dynamic scene.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 1A is a schematic view of a system according to an embodiment of an aspect of the present disclosure;

FIG. 1B is a flowchart of a method according to an embodiment of an aspect of the present disclosure.

FIG. 2 show swept coded aperture real-time femtophotography (SCARF) of single ultrashort pulses transmitting through three transparencies: FIG. 2A shows representative frames from reconstructed movies at 116.3 Tfps; FIG. 2B shows representative frames from reconstructed movies at 74.9 Tfps; and FIG. 2C shows representative frames from reconstructed movies at 56.8 Tfps; FIG. 2D, FIG. 2E and FIG. 2F show a time courses of the normalized average intensities for the reconstructed movies presented in FIGS. 2A-2C, the measurements using the second harmonic generation frequency-resolved optical gating (SHG-FROG) method being also shown as references;

FIG. 3 show swept coded aperture real-time femtophotography (SCARF) of ultrafast absorption of a shaped laser beam on a ZnSe plate: FIG. 3A is a schematic view of a system according to an embodiment of an aspect of the present disclosure; FIG. 3B shows representative frames from the reconstructed movies with imaging speeds of 6.5 Tfps; FIG. 3C shows measured velocities in units of the vacuum speed of light c of the top and bottom fronts of absorption, labeled by the markers, along the x and y directions compared to the theoretical predictions, shown as in dashed lines, the showing the instantaneous velocities in the x and the y directions of the top trace ($v_{tx}$ and $v_{ty}$) and the bottom trace ($v_{bx}$ and $v_{by}$);

FIG. 4 show swept coded aperture real-time femtophotography (SCARF) of ultrafast laser-induced transient birefringence in a Kerr medium.

FIG. 5 show swept coded aperture real-time femtophotography (SCARF) of ultrafast demagnetization of a GdFeCo thin film: FIG. 5A is a schematic view of a system according to an embodiment of an aspect of the present disclosure, with the probe pulse passing through an object (see inset) to probe two different areas of the sample simultaneously; FIG. 5B shows stack-ups of normalized intensity of s- and p-polarization in the two selected areas.

FIG. 6 show calibrating swept coded aperture real-time femtophotography (SCARF)'s spatial encoding operation.

FIG. 7 show a comparison of reconstructed image quality of compressed ultrafast photography (CUP) and swept coded aperture real-time femtophotography (SCARF): FIG. 7A shows a static spoke pattern (left panel) and the varying intensity in the ground truth, the inset showing a zoom-in view of the pattern center; FIG. 7B shows a snapshot generated by compressed ultrafast photography (CUP), the inset showing a zoom-in view of the pattern center; FIG. 7C shows a snapshot generated by swept coded aperture real-time femtophotography (SCARF), the inset showing a zoom-in view of the pattern center; FIG. 7D shows representative reconstructed frame of compressed ultrafast photography (CUP); FIG. 7E shows representative reconstructed frame of swept coded aperture real-time femtophotography (SCARF); FIG. 7G and FIG. 7H show spatial frequency distributions of the images in the ground truth of FIG. 7A, compressed ultrafast photography (CUP) reconstruction (FIG. 7D), and swept coded aperture real-time femtophotography (SCARF) reconstruction (FIG. 7E), respectively, the noise-limited bandwidth being delineated by the dashed circle.

FIG. 8 show second harmonic generation frequency-resolved optical gating (SHG-FROG) measurements of the three ultrashort pulses used in swept coded aperture real-time femtophotography (SCARF)'s proof-of-concept experiments: FIG. 8A, FIG. 8B and FIG. 8C show retrieved second harmonic generation frequency-resolved optical gating (SHG-FROG) traces of the ultrashort pulses; FIG. 8D, FIG. 8E and FIG. 8F show pulse intensity and phase profiles in the time domain.

FIG. 9 show swept coded aperture real-time femtophotography (SCARF) of ultrafast absorption on a ZnSe plate: FIG. 9C shows reconstructed frames of absorption front's propagation in a line pattern imaged at 156.3 Tfps; FIG. 9D shows intensity profiles of a selected line in adjacent frames (marked by dashed lines in successive frames at 0 fs and at 6.4 fs in FIG. 9C at) with a 6.4-fs time interval; FIG. 9E shows emulating an imaging speed of 78.2 Tfps by binning the adjacent two frames in FIG. 9C; FIG. 9F shows intensity profiles of a selected line in adjacent frames with a 12.8-fs time interview (marked by the dash-dotted lines in successive frames at 0 fs and 12.8 fs in FIG. 9E)

FIG. 11 show details on swept coded aperture real-time femtophotography (SCARF) of ultrafast demagnetization of a GdFeCo alloy film.

FIG. 12 shows Table 1 of swept coded aperture real-time femtophotography (SCARF)'s system parameters for each experiment;

FIG. 13 shows Table 2 of a comparison of swept coded aperture real-time femtophotography (SCARF) to representative single-shot compressed temporal imaging: coded aperture compressive temporal imaging (CACTI); compressed ultrafast spectral photography (CUSP); compressed ultrafast spectral-temporal (CUST) imaging; multiple-aperture compressed-sensing CMOS (MA-CS CMOS), with $N_x$ and $N_y$:numbers of pixels in the x and y directions and $N_t$:sequence depth; and FIG. 14 shows Table 3 of a comparison of a comparison of swept coded aperture real-time femtophotography (SCARF) to sequentially timed all-optical mapping photography (STAMP).

DESCRIPTION OF ILLUSTRATIVE EMBODIMENTS

Figure 1C:
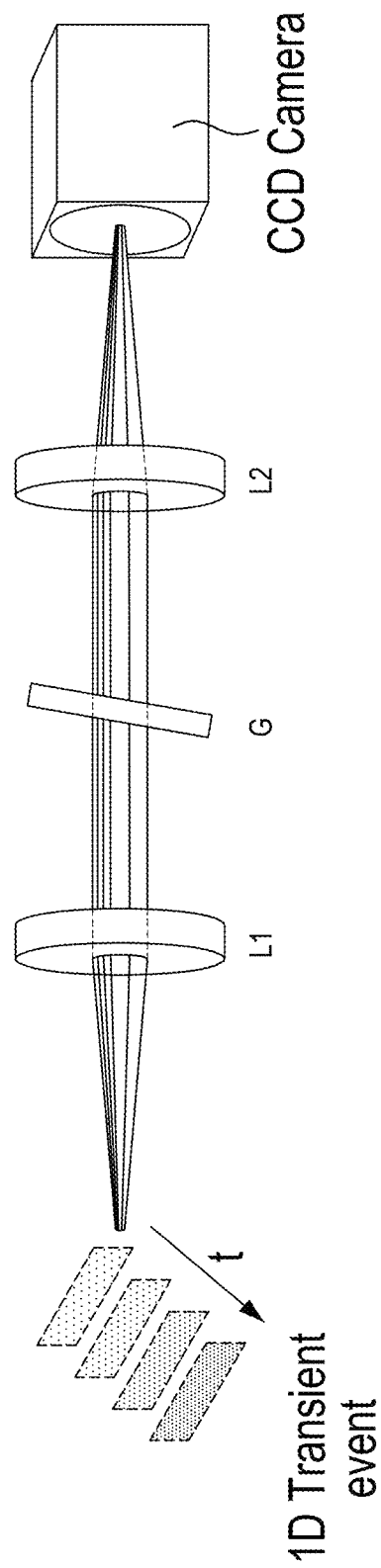
FIG. 1C is a schematic view of a system according to another embodiment of an aspect of the present disclosure.

The present invention is illustrated in further details by the following non-limiting examples.

FIG. 1A is a schematical view of a system according to an embodiment of an aspect of the present disclosure.

A dynamic scene is illuminated by a single ultrafast probe pulse from a laser (788.8 nm central wavelength, time duration of the pulse 362 fs-7.7 ps). The probe pulse is selected as a linearly chirped laser pulse, so that each wavelength in the bandwidth of the probe pulse carries a specific timestamp. The probe pulse transmitted by the dynamic scene is recorded in a snapshot by an imaging unit. The imaging unit may be an objective lens (such as MY20X-824, Mitutoyo for example), or two 4f optical imaging systems for example. The imaging system as illustrated herein comprises a first 4f optical imaging system (see lenses L1 and L2 in FIG. 1A) and a second 4f optical imaging system (lenses L1 and L2 in FIG. 1A); the transmitted pulse is first imaged by the first 4f optical imaging system and sent to an encoder selected as a static coded aperture such as a pseudo-random binary transmissive mask or an optimized mask 10. The first spectral dispersion shears temporal information that is contained in wavelengths to different positions for spatial encoding by the mask 10. Then, the pulse is relayed to a detector selected according to different response wavelengths, for example, a UV or visible charge-coupled device (CCD) camera or a complementary metal-oxide-semiconductor (CMOS) camera, by the second 4f optical imaging system (FIG. 1A), a shearing and reversed shearing unit (gratings G1 and G2 in FIG. 1A; M1 and M2 are mirrors) being used to provide a second spectral shearing in the reverse direction relative to the first 4f optical imaging system. This symmetrical configuration of the first and the second dispersive 4f imaging systems is selected to cancel the smearing in the dynamic scene and sweep the static coded masks of individual wavelengths, thus in different times. The detector 12 records a compressed snapshot of the temporal information of the dynamic scene, which is read out by the single probe pulse (see Supplementary Note 1 and FIG. 16). After data acquisition, the captured snapshot is processed by a computer using a compressed sensing-based algorithm that solves a minimization problem to retrieve the (x,y,t) datacube of the dynamic scene.

As illustrated in FIG. 1B, data acquisition generally comprises time-spectrum mapping (M) when the single chirped pulse probes the dynamic scene; storing temporal information at different wavelengths; a first spectral shearing (S) of the dynamics scene by the dispersion induced in the first dispersive 4f; spatial encoding (C) by the pseudo-random binary transmissive mask; a second spectral shearing in the reverse direction (S') induced by the second dispersive 4f system; and spatiotemporal integration of the spatially encoded dynamic scene on the CCD camera 12, by spatially integrating over each pixel and temporally integrating over the exposure time (T). As a result, the captured snapshot E[m,n] is linked with the transmittance modulated by the dynamic scene a(x,y,t) as follows:

$$E[m,n] = O\ a(x,y,t)$$

m and n are the pixel indices of the CCD camera. The operator O=TS'CSM.

The reconstruction of the image from the acquired data is an inverse problem. The captured snapshot E[m,n] is processed using an algorithm developed from a plug-and-play alternating direction method of multipliers (PnP-ADMM). Leveraging the spatiotemporal sparsity of the dynamic scene and the prior knowledge of each operator, the dynamic scene a(x,y,t) can be retrieved by solving a minimization problem as follows:

$$\hat{a} = \underset{a \in A}{\operatorname{argmin}} \left\{ \frac{1}{2} \|Oa - E\|_2^2 + R(a) + I_+(a) \right\}.$$

$\|\bullet\|_2$ represents the $l_2$ norm.

$$\frac{1}{2}\|Oa - E\|_2^2$$

is a fidelity term representing the similarity between the measurement and the estimated result. R(•) is an implicit regularizer that promotes sparsity in the dynamic scene. $I_+(\bullet)$ represents a non-negative intensity constraint.

By synergizing ultrafast laser science, compressed sensing, and pulse shaping, the present method enables ultrafast sweeping of a static coded aperture during the recording of an ultrafast event, which brings ultrafast pixel-wise encoding of up to 156.3 THz to a typical CCD camera. The single-shot all-optical ultrafast imaging ability of the method at tunable frame rates is demonstrated at multiple spatial scales, with various contrasts, and in both reflection and transmission modes.

For illustration, the present method and system are used to image three ultrafast phenomena in two-dimensional light-matter interactions, including ultrafast absorption in a semiconductor, dynamic birefringence in a Kerr medium, and ultrafast demagnetization of a metal alloy.

The probe pulse is selected as a linearly chirped laser pulse, so that each wavelength in the bandwidth of the probe pulse carries a specific timestamp. The probe pulse transmitted by the dynamic scene is recorded in a snapshot by an imaging unit.

The system may be modified to a point-detection or one-dimensional imaging streak camera. FIG. 1C for example schematically shows a linearly chirped laser probe pulse, of a wavelength bandwidth tens of nanometers and a pulse duration from several hundred femtoseconds to picosecond, transmitted by a one-dimensional (1D) transient event, recorded by an imaging unit comprising a dispersive 4f imaging system (lenses L1 and L2 and grating G), and then relayed to a CCD camera. Thus, the system may be fully compatible and complementary to existing streak camera and spectroscopy systems. In addition, the system may be integrated into other CCD or CMOS cameras to sense different spectrums, such as. ultraviolet, visible, infrared for example, or various contrasts (bright field imaging, dark field imaging). For example, by using a middle-infrared camera, the system may be used for observing the ultrafast event that happens in the middle-infrared range; or, by blocking the unscattered light at the Fourier plane using a beam block, the system may be used for dark-field imaging.

Moreover, the installation of the present system provides an economical solution to increased measurement capability in a number of laboratories in companies and universities already equipped with femtosecond laser oscillators.

As people in the art will appreciate, with salient features of a 156.3 Tfps imaging speed, compatibility to any CCD or CMOS cameras, and affordable expenses, the present system may find a range of applications in the field of ultrafast imaging, sensors, and spectroscopy.

Annex

For illustration, the present method and system are used to image three ultrafast phenomena in two-dimensional light-matter interactions, including ultrafast absorption in a semiconductor, dynamic birefringence in a Kerr medium, and ultrafast demagnetization of a metal alloy.

As mentioned hereinabove, the implementation of a number of novel imaging concepts, such as time stretching and spatial division, can boost the imaging speed to Tfps. However, these methods are usually strained by a shallow sequence dept, that is a number of frames in each movie.

The limitations in the methods of direct acquisition can be lifted using computational imaging. Among existing methods, a popular strategy is to encode each frame of the scene with pre-determined patterns at a rate much higher than the acquisition speed of the sensor. Each captured snapshot represents temporal integration of the spatiotemporally modulated dynamic scene. Then, an ultrafast movie is reconstructed with high fidelity using a compressed sensing-based algorithm.

To overcome the limitations in existing methods, a method of swept coded aperture real-time femtophotography referred to as swept coded aperture real-time femtophotography (SCARF) method, is presented herein, which enables a full pixel-wise encoding depth with a new speed record in single-shot ultrafast imaging by using a single chirped pulse and a modified pulse shaping system. Leveraging time-spectrum mapping and spectrum-space sweeping, the present method attaches pixel-wise coded apertures to an ordinary CCD camera at up to 156.3 THz in real time. The method is tested in multiple spatial and temporal scales, with various contrasts, and in both reflection and transmission modes. To show the utility range of the method, the method is used for single-shot real-time imaging of two-dimensional (2D) transient light-matter interactions, including ultrafast absorption on a semiconductor, dynamic birefringence in a Kerr medium, and ultrafast demagnetization in a metal alloy.

System and Principle of Swept Coded Aperture Real-Time Femtophotography (SCARF).

The method brings in several salient advantages compared to existing methods in single-shot compressed temporal imaging, as summarized here and further explained in Supplementary Notes 4-5 and Tables 2-3 in FIGS. 13-14. Because of the two symmetrical 4f systems, the static coded aperture is swept at a speed of up to $v_s=1.72\times10^9$ m/s, which enables ultrafast pixel-wise spatiotemporal encoding. The sweeping speed also determines the frame rate of the method by $r=v_s/d$, where d is the CCD camera's pixel width in the sweeping direction (see derivation in Supplementary Note 4). This all-optical configuration provides encoding rates of up to 156.3 THz to individual pixels on the employed CCD camera, hence enabling single-shot real-time femtophotography. Meanwhile, with a compression ratio equal to the sequence depth, the field of view (FOV) of the method always equals the sensor size regardless of the duration of the dynamic scene. Finally, in the snapshot, the area with non-zero intensity delineates the region of occurrence of the dynamic scene. This spatial constraint, naturally embedded in the acquired data, facilitates the image reconstruction, as further explanations are included in Supplementary Note 4 and FIG. 7.

Swept Coded Aperture Real-Time Femtophotography (SCARF) of Single Ultrashort Pulses Transmitting Through Transparencies The method and system are used to image single chirped pulses transmitting through three patterned transparencies at multiple imaging speeds. The chirped pulse was divided by a beam splitter. The reflected component was measured by a second harmonic generation frequency-resolved optical gating (SHG-FROG) device (see details in Supplementary Note 6 and FIG. 8). The transmitted component passed through a transparency film with a printed pattern. FIG. 2A shows five representative frames of a chirped pulse, with a full-width-at-half-maximum (FWHM) duration of 362 fs, passing through a bar pattern imaged by Swept coded aperture real-time femtophotography (SCARF) at 116.3 Tfps. Similarly, FIG. 2BC show single chirped pulses, with FWHM durations of 561 fs and 739 fs, transmitting through the patterns of an "INRS" logo and a maple leaf, imaged by Swept coded aperture real-time femtophotography (SCARF) at 74.9 Tfps and 56.8 Tfps, respectively. The average intensity of each frame is analysed. Shown in FIGS. 2D-F, these single-shot results well agree with the scanned second harmonic generation frequency-resolved optical gating (SHG-FROG) measurements.

Swept Coded Aperture Real-Time Femtophotography (SCARF) of Ultrafast Absorption in Semiconductor To show its broad utility, the method was implemented to monitor three ultrashort phenomena of light-matter interactions in 2D with different imaging contrasts. As the first demonstration, femtosecond laser-induced ultrafast absorption in a semiconductor were imaged (FIG. 3A and detailed in FIG. 9). A single 40 fs, 360 μJ pump pulse was shaped to a ring by passing through an axicon and a convex lens before obliquely illuminating a zinc selenide (ZnSe) plate. At an incident angle of 35.4°, an elliptical ring was generated on the plate. The high intensity induced by this laser pulse abruptly increased the free carrier density near the surface of this plate, resulting in a transient decrease in its transmissivity 38. Besides, the oblique incidence led to a faster-than-light propagation of the absorption front on the plate (see the detailed derivation in Supplementary Note 7). The pump pulse damaged the sample permanently after a single pulse. This non-repeatable phenomenon was probed by a 6.5 ps chirped pulse with a normal angle of incidence, corresponding to an imaging speed of 6.5 Tfps.

Six selected frames are presented in FIG. 3B. The decrease of transmissivity at one vertex of this ellipse immediately breaks in a pair of traces propagating toward opposite directions. These traces, whose time courses delineate the ellipse, eventually converge at the other vertex. The instantaneous velocities for both traces were also calculated t. As shown in FIG. 3C, the result demonstrates in the y direction, the speeds of both traces start at infinity with opposite directions, then reduce to zero, and finally reaccelerate to infinity with the opposite propagating directions. In contrast, the speeds in the x direction stay at a constant superluminal value of $(5.0\pm0.8)\times10^8$ m/s (mean±standard deviation). The measured values well match the theory $(5.2\times10^8$ m/s), showing Swept coded aperture real-time femtophotography (SCARF)'s excellent ability to track even superluminally moving objects.

The method was also used to image a line target, as detailed in Supplementary Note 7. In brief, the absorption front propagated with an apparent velocity of $8.6\times10^9$ m/s in the −x direction. Swept coded aperture real-time femtophotography (SCARF) imaged this event at 156.3 Tfps in a single shot. The evolution is shown in FIG. 9C. Further analysis shows that the method can distinguish the sequential absorption onsets of two locations separated by 54.3 µm (FIG. 9D). This experiment demonstrates the highest imaging speed of the method not only can be used to image a realistic sample in light-matter interactions but also surpasses the state-of-the-art method 35 in resolving fine spatiotemporal details (see FIGS. 9E-9F).

Figure 4A:
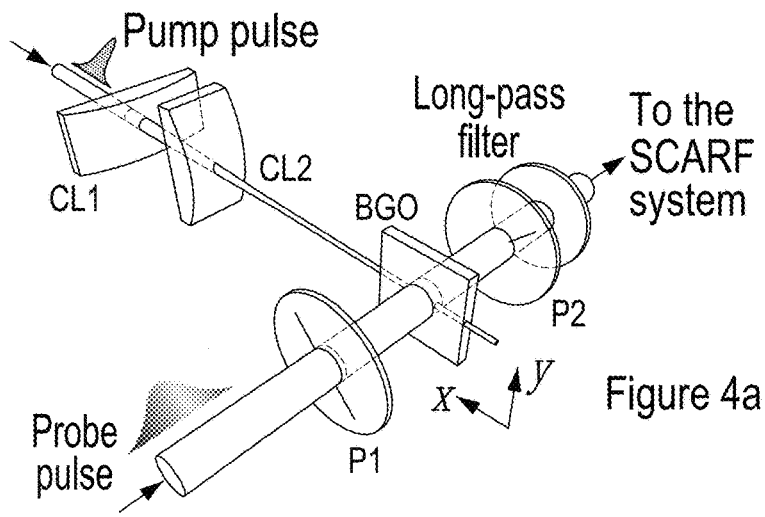
FIG. 4A is a schematic of single-shot imaging of an intense femtosecond pulse propagating in a $Bi_4Ge_3O_{12}$ (BGO) crystal.
Figure 4C:
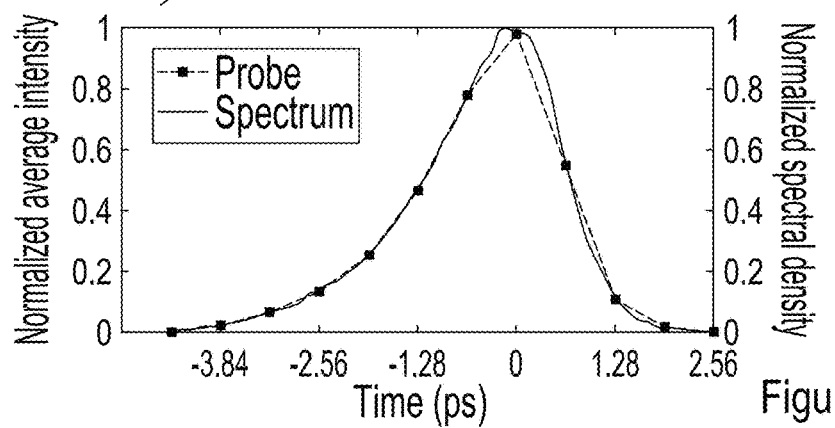
FIG. 4C shows normalized average intensity of each reconstructed frame compared with the normalized spectral density of the probe pulse.
Figure 4D:
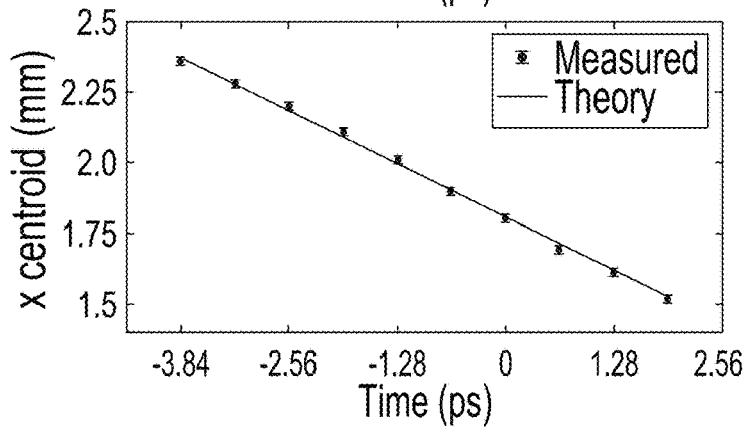
FIG. 4D shows measured x centroid of the pulse in each frame compared with the theory, the error bar indicating stand deviation.
Figure 4E:
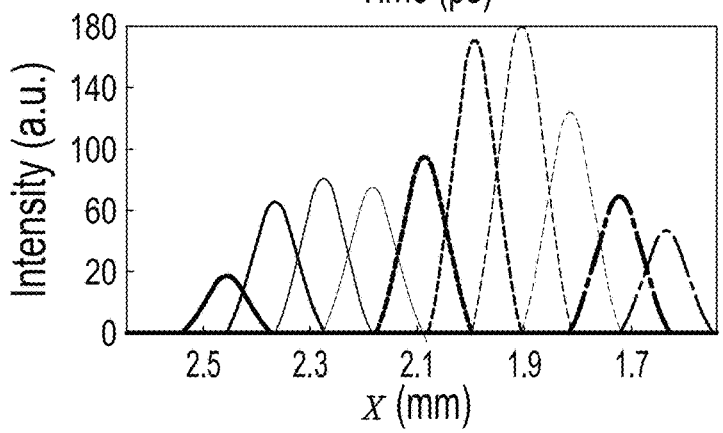
FIG. 4E shows cross-sections of reconstructed beam profiles averaged along the y axis.
Figure 4B:
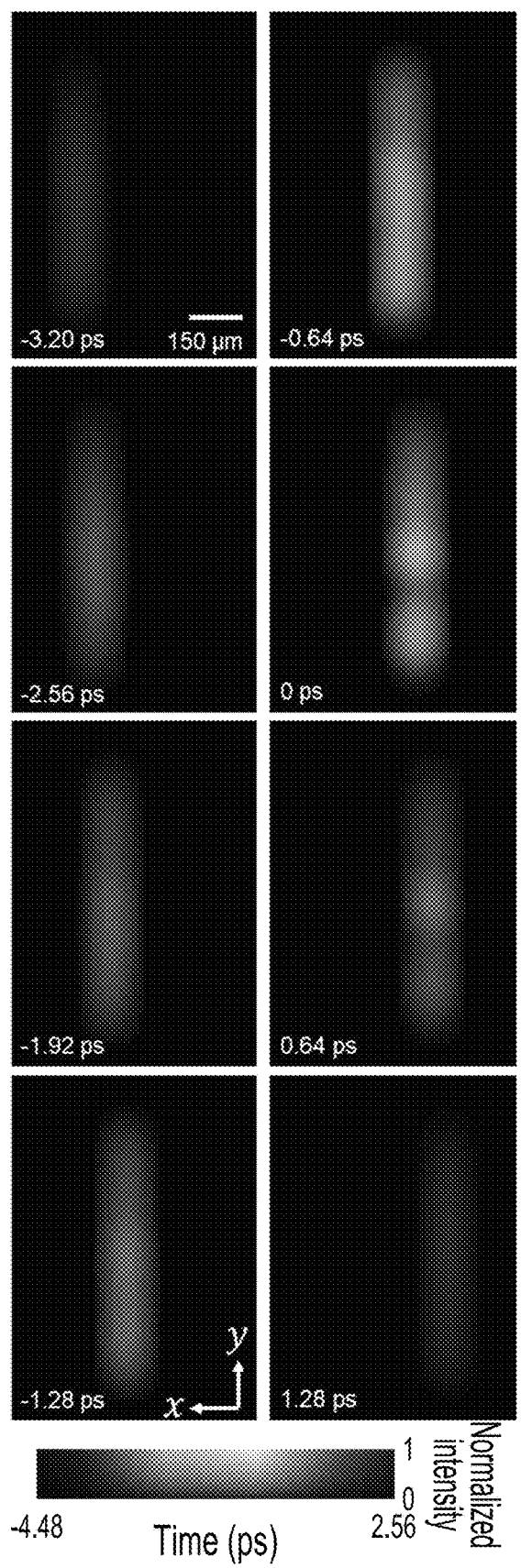
FIG. 4B shows representative frames of the normalized intensity of transmitted beam profiles.
Figure 10:
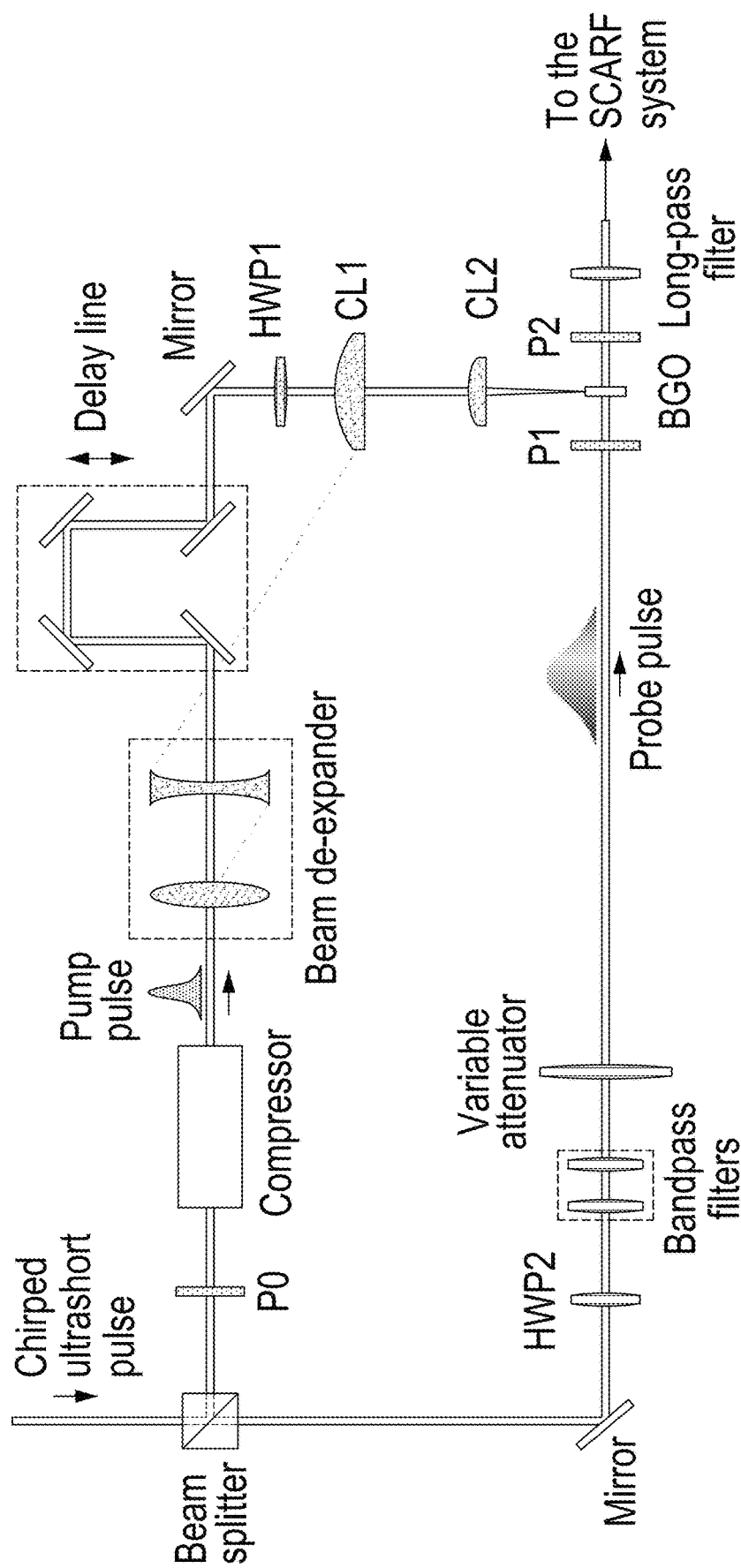
FIG. 10 is a schematic view of a system for imaging the propagation of an ultrashort laser pulse in a Kerr medium according to an embodiment of an aspect of the present disclosure.

Swept Coded Aperture Real-Time Femtophotography (SCARF) of Dynamic Birefringence in a Kerr Medium As the second demonstration, an ultrashort laser pulse was imaged as it travels through a Kerr medium via ultrafast laser-induced birefringence (FIG. 4A). FIG. 4A is a schematic of single-shot imaging of an intense femtosecond pulse propagating in a $Bi_4Ge_3O_{12}$ (BGO) crystal, where cylindrical lenses CL1 and CL2 shape the spatial profile of the pump pulse to fit the dimensions of the BGO crystal, polarizers P1 and P2 have polarization axes at +4.5° and −45°. Details of the experimental system are presented in Supplementary Note 8 and FIG. 10 showing a schematic view of a system for imaging the propagation of an ultrashort laser pulse in a Kerr medium according to an embodiment of an aspect of the present disclosure, with BGO: $Bi_4Ge_3O_{12}$ crystal; CL1-CL2: cylindrical lenses; HWP1-HWP2: half-wave plates; P0-P2: polarizers. In brief, a pump pulse (40 fs pulse duration, 800 µJ pulse energy, and s-polarization) was shaped by two cylindrical lenses to a rectangular (x,y) profile. This pulse traversed through a $Bi_4Ge_3O_{12}$ (BGO) slab, with a refractive index of 2.07, to induce transient birefringence. This slab was sandwiched by two polarizers whose polarization axes were aligned at +45° and −45°, respectively. A linearly chirped pulse of 7.7 ps probed this event. The time-resolved light intensity transmitted by this cross-polarization system was recorded by swept coded aperture real-time femtophotography (SCARF) at 1.6 Tfps. Eight representative frames are shown in FIG. 4B. The average intensity of the reconstructed frames well agrees with the normalized spectrum density of the probe pulse measured by a spectrometer (FIG. 4C). Moreover, by tracking the centroid of the reconstructed pulse from these frames (FIG. 4D), the swept coded aperture real-time femtophotography (SCARF)-recovered light speed in the BGO slab was $(1.46\pm0.06)\times10^8$ m/s, consistent with the theoretical value ($1.45\times10^8$ m/s). Finally, the averaged intensity is shown in FIG. 4B along the y axis. These cross-sections are shown in FIG. 4E. From these curves, the measured pulse width was quantified to be 174.3±8.9 µm. Compared to the incident pulse, which relates to a spread of 5.8 µm, the longer width from the reconstructed results is attributed to the temporal broadening by the finite imaging speed, the size of encoding pixels, and the relaxation time of BGO 39. It is worth noting that although the experiment did not damage the BGO crystal in a single shot, a partial loss of transparency was observed after the data acquisition, indicating a potential structural change in the sample by the single pump pulse. In this case, swept coded aperture real-time femtophotography (SCARF) is more suitable for observing this difficult-to-reproduce phenomenon in comparison to multiple-shot pump-probe imaging methods.

Swept Coded Aperture Real-Time Femtophotography (SCARF) of Ultrafast Demagnetization of an Alloy Film.

Figure 5C:
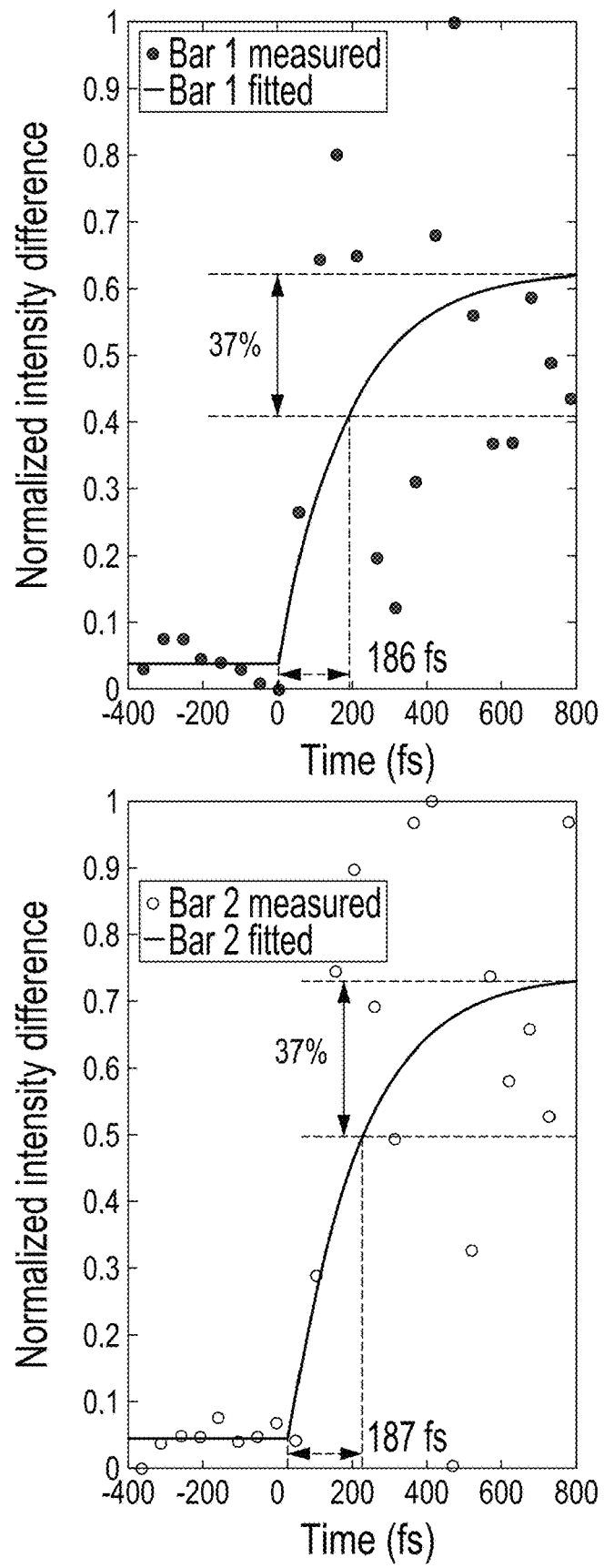
FIG. 5C shows time-resolved normalized intensity difference between the s- and p-polarization light for Bar 1 (top) and Bar 2 (bottom)

As the last demonstration of the versatility of the method and system in studying diverse physical phenomena, ultrafast demagnetization of a pre-magnetized GdFeCo alloy film 40 was imaged. As shown in FIG. 5A, a 40 fs, 6.4 µJ pump pulse is loosely focused on this film with an incident angle of 37° to induce ultrafast demagnetization. A 1.2 ps linearly chirped pulse (with −45° linear polarization) probes two selected 2D areas (inset in FIG. 5A) at 19.1 Tfps via a reflection-mode microscope system. The demagnetization induces a small change in the polarization angle of the probe pulse, which is detected by polarization-resolved swept coded aperture real-time femtophotography (SCARF), as described in Supplementary Note 9 and FIG. 11. FIG. 5B shows the stack-ups of the 2D intensity distribution of the s- and p-polarized light in both Bar 1 and Bar 2. Before the incidence of the pump pulse, the intensities of both channels stay almost equal. The impingement of the pump pulse on the sample increases the intensity of the p-polarized light while decreasing that of the s-polarized light. To quantitatively analyze the results, the time courses of the intensity difference between s- and p-polarized light are plotted. As shown in FIG. 5C, the demagnetization times of Bar 1 and Bar 2 are calculated to be 186±21 fs and 187±20 fs, respectively. Both values are in good agreement with the literature 40 as well as with the multiple-shot experiment (see details in Supplementary Note 9 and FIG. 11B). The result also reveals that the onset of this change is different by 36 fs between these two areas, which is attributed to the oblique incidence of the pump pulse. To quantitatively showcase the advantage of the method in this particular case, the data from these two areas were averaged as if spatially resolved imaging was not available. As shown in FIG. 11C, the demagnetization time is quantified to be 198 fs, which produces an error of 6.4%. Thus, the 2D real-time ultrafast imaging provided by swept coded aperture real-time femtophotography (SCARF) leads to more accurate quantification of demagnetization time. Meanwhile, because the demagnetization strength is known to be sensitive to the energy of the pump laser, single-shot swept coded aperture real-time femtophotography (SCARF) is immune to the shot-to-shot variation induced by the pump laser's fluctuation.

Swept coded aperture real-time femtophotography (SCARF) advances the frontier of ultrafast optical imaging in both sensing concepts and technical specifications. The system embodies the advanced paradigm of single-shot video compressed sensing with the ultrafast sweeping of a static coded aperture. The enabled ultrafast pixel-wise encoding in the spatial domain offers a bandwidth of up to 156.3 THz to an ordinary CCD camera, which is more than three orders of magnitude greater than the theoretical limit of semiconductor sensors. Constructed by using off-the-shelf and passive components, swept coded aperture real-time femtophotography (SCARF) is low cost and has low power consumption. Altogether, swept coded aperture real-time femtophotography (SCARF) exhibits the fastest real-time imaging modality with an outstanding sequence depth, up to 132 frames. These specifications could be further improved by using advanced supercontinuum sources, high dynamic range cameras, Fourier-domain amplification, and machine learning image reconstruction. Provided the proper sources and sensing devices, swept coded aperture real-time femtophotography (SCARF) could even be extended to other spectral ranges, such as X-ray and mid-infrared.

Swept coded aperture real-time femtophotography (SCARF) expands the application scope of the classic pulse shaper to single-shot ultrafast imaging. Starting from a 4f system (see G1, L2, L3, and G2 in FIG. 1A), swept coded aperture real-time femtophotography (SCARF)'s hardware is built with two modifications—using a pseudo-random binary mask for amplitude modulation and adding two additional lenses (see L1 and L4 in FIG. 1A) to perform optical Fourier transformation before and after the two gratings. This arrangement converts the pulse shaper to two cascaded dispersive 4f imaging systems interlinked by the encoding mask. Its symmetric configuration naturally enables spectral shearing in opposite directions without the need for synchronization. The Fourier plane of a conventional pulse shaping system, where is now occupied by the encoding mask, still manipulates individual wavelengths of a broadband laser pulse. However, different from the conventional operation, the incorporation of the lens L1 and the linearly chirped pulse brings the encoding of the sequential time information with different sections of a mask in the spatial domain. Moreover, the implementation of the compressed sensing model allows the mixture of spectral and spatial information, nullifying the line-focusing necessity in a conventional 4f system. Finally, by exploiting the time-spectrum-space conversion, the swept coded aperture real-time femtophotography (SCARF) system converts the ultrashort timescale of a chirped ultrafast pulse to ultrafast sweeping of the coded aperture. In summary, swept coded aperture real-time femtophotography (SCARF) inherits the advantages from the classic pulse shaper and augments its optical processing ability particularly for observing transient single events.

As a generic and economical imaging modality, swept coded aperture real-time femtophotography (SCARF) has promising applications in ultrafast science. Of particular relevance are the three light-interaction phenomena studied in the present experiments. single-shot swept coded aperture real-time femtophotography (SCARF) of ultrafast absorption on ZnSe could contribute to the study of ultrafast carrier dynamics in semiconductor thin films. Meanwhile, real-time imaging of dynamic birefringence in a Kerr medium will provide new opportunities to track both the onset and reset of phase transition in photoexcited materials on the ultrafast timescale. Finally, single-shot swept coded aperture real-time femtophotography (SCARF) of ultrafast demagnetization of metal alloys may open a new route for studying ultrafast magnetic switching for possible future applications of magnetic storage devices. Current time-resolved methods require using numerous probe pulses at different delays and rely on the reproducibility of the phenomenon to procure the dynamics. In contrast, swept coded aperture real-time femtophotography (SCARF) marks single-shot 2D optical imaging of ultrafast demagnetization. Coupling swept coded aperture real-time femtophotography (SCARF) into widefield super-resolution microscopy could be particularly valuable for the study of domain dynamics during ultrafast demagnetization and switching.

Method-Operating Principle of Swept Coded Aperture Real-Time Femtophotography (SCARF)

Swept coded aperture real-time femtophotography (SCARF)'s data acquisition can be expressed by five successive operations, illustrated in FIG. 1B and derived in Supplementary Note 1. First, time-spectrum mapping (denoted by M) is executed when the single chirped pulse probes the dynamic scene, storing temporal information at different wavelengths. Then, the dispersion induced in the first dispersive 4f system enables spectral shearing of the dynamics scene, denoted by S, followed by spatial encoding by the pseudo-random binary transmissive mask, denoted by C. Afterward, the second dispersive 4f system induces another spectral shearing in the reverse direction, denoted by S'. Finally, the spatially encoded dynamic scene experiences spatiotemporal integration on the CCD camera, that is spatially integrating over each pixel and temporally integrating over the exposure time; denoted by T. In this way, the captured snapshot, E[m,n], is linked with the transmittance modulated by the dynamic scene a(x,y,t) as follows:

$$E[m,n] = O\, a(x,y,t) \tag{1}$$

where m and n are the pixel indices of the CCD camera. The operator O=TS'CSM.

In the ensuing image reconstruction, E[m,n] is input to a new algorithm developed from the plug-and-play alternating direction method of multipliers (PnP-ADMM) framework (details of derivation are shown in Supplementary Note 2). Leveraging the spatiotemporal sparsity of the dynamic scene and the prior knowledge of each operator, a(x,y,t) can be retrieved by solving a minimization problem as follows:

$$\hat{a} = \underset{a \in A}{\mathrm{argmin}}\left\{\frac{1}{2}\|Oa - E\|_2^2 + R(a) + I_+(a)\right\}. \tag{2}$$

Here, A represents a set of solutions that satisfy the spatial constraint. $\|\cdot\|_2$ represents the l2 norm. $\frac{1}{2}\|Oa\text{-}E\|\_2\text{\textasciicircum}2$ is the fidelity term representing the similarity between the measurement and the estimated result. $R(\cdot)$ is the implicit regularizer that promotes sparsity in the dynamic scene (further explained in Supplementary Note 2). $I_+(\cdot)$ represents a non-negative intensity constraint.

Details on the System and Sample Preparation

The components in the swept coded aperture real-time femtophotography (SCARF) system as illustrated in FIG. 1A include four 100 mm-focal-lengths lenses (L1 and L4, LA1509, Thorlabs; L2 and L3, LA1050, Thorlabs), two 1200 line/mm gratings (G1 and G2, GR25-1208, Thorlabs), one static pseudo-random binary transmissive mask (HTA Photomask, 80 µm×80 µm encoding pixel's size), and a CCD camera (GS3-U3-41C6NIR-C, FLIR, 2048×2048 pixels).

The illumination of the swept coded aperture real-time femtophotography (SCARF) system was provided by a femtosecond Titanium-Sapphire laser amplifier at the multi-kHz beamline of the Advanced Laser Light Source (ALLS) at the Centre Énergie Matériaux Télécommunications, Institut National de la Recherche Scientifique. A two grating-based pulse stretcher was used to generate linearly chirped pulses used in the experiments of single ultrashort pulses transmitting through transparencies and ultrafast demagnetization of an alloy film. The uncompressed linearly chirped pulse from the laser amplifier was used for the experiments of dynamic absorption in a semiconductor and transient birefringence in a Kerr medium. All these pulses output from the laser pass through two bandpass filters (LD01-785/10-25 and LL01-810$^{-25}$, Semrock) to tune their bandwidths so that the durations of the generated probe pulses match those of the dynamic events. Finally, pixel binning was implemented to improve the quality of the acquired snapshot. Technical specifications of the probe pulses are summarized in the Table 2 (FIG. 13)

In the dynamic absorption experiment as illustrated in FIG. 3A, a 1-inch ZnSe plate (WG71050, Thorlabs) was used. Other components include an axicon (130-0278, Eksma Optics) and a 150-mm-focal length focusing lens (LA1433-B, Thorlabs). The focusing lens was placed 360 mm away from the axicon and about 150 mm away from the ZnSe plate.

In the transient birefringence experiment as illustrated in FIG. 4A, a 10×10×1 mm³ BGO slab (MSE Supplies) was used as the sample. To enhance the coupling efficiency of the pump pulse, the 10 mm ×1 mm sides of this sample were delicately polished by a series of films (LFCF, LF1D, LF3D, LF6D, and LF30D, Thorlabs). To minimize the interference of the autofluorescence light generated accompanying the Kerr effect, a long-pass filter (FF01-715/LP-25, Semrock) was inserted before the swept coded aperture real-time femtophotography (SCARF) system, and an iris was added in front of the CCD camera to limit the field of view (FOV) to about 1 mm×1 mm. Other components include a 500 mm-focal-length cylindrical lens (CL1, 120-0234E, Eksma Optics), a 300 mm-focal-length cylindrical lens (CL2, 120-0229E, Eksma Optics), polarizers (P1 and P2, LPNIR100-MP2, Thorlabs).

In the transient demagnetization experiment as illustrated in FIG. 5A, a GdFeCo alloy thin film was used as the sample. This multi-layer film was arranged by glass substrate/Ta (3 nm)/Cu (5 nm)/GdFeCo (20 nm)/Cu (5 nm)/Al (2.5 nm). Other components include an objective lens (MY20X-824, Mitutoyo), a beam splitter (BSW27, Thorlabs), a focusing lens (LA1433-B, Thorlabs), two tube lenses (AC254-200-B, Thorlabs). A mask of two bars (0.25 mm×1.25 mm in size and 0.75 mm separation) is placed at 200 mm away from the tube lens in the illumination beam path.

Supplementary Materials

Supplementary Note 1: Derivation Swept Coded Aperture Real-Time Femtophotography (SCARF)'s Data Acquisition In data acquisition, swept coded aperture real-time femtophotography (swept coded aperture real-time femtophotography (SCARF)) compressively records an (x,y,t) dynamic scene into a two-dimensional (2D) snapshot (FIG. 6). For simplicity of notation, the following assumptions were made. First, the imaging system has a unit magnification. Second, the dynamic scene can be perfectly imaged throughout the system. Third, the chirped pulse has a perfect linear relationship between the wavelength and time. Fourth, the deployed camera and the encoding mask have the same pixel dimension, denoted by d.

In the following, the expression of swept coded aperture real-time femtophotography (SCARF)'s data acquisition is first derived in the continuous model and then discretized for the image reconstruction algorithm. For an ultrashort laser pulse with a temporal linear chirp, the relationship between time t and wavelength λ can be expressed as follows:

$$\lambda = \lambda_0 + (t - t_0) \frac{\lambda_0^2}{2\pi c \varphi''} \quad (S1)$$

where $\lambda_0$ is the central wavelength of the chirped laser pulse, and $t_0$ is time points that correspond to the central wavelength. For a narrow spectral band, only up to second-order dispersion in the optical element is considered, which is represented as $\varphi''$. Further, $\beta=2\pi c\varphi''/\lambda_0^2$ as linear time-spectrum mapping parameter, where c is the vacuum speed of light. Relation (S1) governs the linear mapping between time and wavelengths, which is denoted by the operator M. Hence, if a dynamic event, whose transmittance to a linear chirped probe pulse is α(x, y, t), the spectral density of the transmitted light is expressed as follows:

$$I_M(x,y,\lambda)=M\{a(x,y,t)\}. \quad (S2)$$

Next, $I_M$(x, y, λ) incidents into the modified pulse shaper (FIG. 1A). The first dispersive 4f imaging system, consisting of lenses L1 and L2, and the grating G1, images the transient scene onto a pseudo-random binary transmissive mask with a spectral shearing operation, denoted by S. The spectral density just before this encoding mask is expressed as follows:

$$I_S(x, y, \lambda) = S\{I_M(x, y, \lambda)\} \quad (S3)$$
$$= \int\int dx' dy' \delta(x' - [x + \alpha f_2(\lambda - \lambda_0)])\delta(y' - y)I_M(x', y', \lambda)$$
$$= I_M(x + \alpha f_2(\lambda - \lambda_0), y, \lambda)$$

Here, δ(•) stands for the Dirac delta function, a is the angular dispersion of the grating G1, and $f_2$ is the focal length of Lens 2.

Then, the mask spatially encodes $I_S$(x, y, λ). Because random binary matrices are largely incoherent with any fixed basis, they are used as a universal coded aperture in swept coded aperture real-time femtophotography (SCARF). The spectral density immediately after this coded aperture is given as follows:

$$I_C(x, y, \lambda) = C\{I_S(x, y, \lambda)\} = c(x, y) \cdot I_M(x + \alpha f_2(\lambda - \lambda_0), y, \lambda), \quad (S4)$$

where C stands for the spatial encoding operator. c(x, y) represents the spatial transmittance of the pseudo-random binary pattern. Relations (S3)-(S4) reveal that the different wavelength components of the incident light are smeared to different spatial positions and thus are encoded by different portions of the mask.

Behind the coded aperture, $I_C$(x, y, λ) passes through another dispersive 4f imaging system, consisting of lenses L3 and L4 and the grating G2, that is symmetric to the first one. This process results in another spectral shearing operation, denoted by S', whose shearing direction is opposite to that of S. The spectral density of light entering the sensor is expressed as follows:

$$I_{S'}(x, y, \lambda) = S'\{I_C(x, y, \lambda)\} = \quad (S5)$$
$$\int\int dx' dy' \delta(x' - [x - \alpha f_4(\lambda - \lambda_0)])\delta(y' - y)I_C(x', y', \lambda) =$$
$$c(x - \alpha f_4(\lambda - \lambda_0), y, \lambda)I_M(x, y, \lambda).$$

Here, $f_4$ is the focal length of Lens 4, and $f_4=f_2$. The first term in Relation (S5), c(x−α$f_4$(λ−$\lambda_0$), y, λ) reveals that the 2D coded aperture sweeps through the three-dimensional (3D) datacube for spatial encoding. The second term, $I_M$(x, y, λ), shows that no shearing effect exists on the transmitted light.

On the sensor, $I_{S'}$(x, y, λ) is recorded via spatiotemporal integration, that is spatially integrated over each sensor pixel and temporally integrated over the duration of the transient event, that is denoted by T. The optical energy measured at pixel [m, n] is given as follows:

$$E[m, n] = T\{I_{S'}(x, y, \lambda)\} = \quad (S6)$$
$$\int dx \int dy \left\{\left[\int d\lambda I_{S'}(x, y, \lambda)\right] rect\left(\frac{x}{d} - \left(m + \frac{1}{2}\right), \frac{y}{d} - \left(n + \frac{1}{2}\right)\right)\right\}.$$

Relations (S2)-(S6) describe a continuous-to-discrete forward model for the swept coded aperture real-time femtophotography (SCARF) system. However, to use this forward model numerically, a discrete-to-discrete model needs to be derived. A voxel of (d, d, $\Delta\lambda_{FI}$, $\tau_{FI}$) in the x-y-λ-t space is used. Here, "FI" stands for "frame interval". $\Delta\lambda_{FI}$ is defined as follows:

$$\Delta\lambda_{FI} = \frac{d}{f_2\alpha}. \tag{S7}$$

Supplementary Note 2: Details of Swept Coded Aperture Real-Time Femtophotography (SCARF)'s Reconstruction Algorithm Swept coded aperture real-time femtophotography (SCARF) uses the plug-and-play (PnP) alternating direction method of multipliers (ADMM) framework for image reconstruction. To retrieve the transmittance of the dynamic scene α(x, y, t), the inverse problem (see Relation (2) hereinabove) is first written as follows:

$$\hat{a} = \underset{a,v,u,w\in A}{\mathrm{argmin}}\left\{\frac{1}{2}\|Tv - E\|_2^2 + R(u) + I_+(w)\right\} \tag{S11}$$

s.t.

$v = O'a,$ $u = a,$ $w = a,$ where v, u, and w are primal variables. The operator O'=S'CSM. In addition, A represents a set of solutions that satisfy the spatial constraint that is generated by binarizing the snapshot image E with an appropriate intensity threshold that is determined by Otsu's method.

Then, Relation (S11) is written in the augmented Lagrangian arguments as follows:

$$\hat{a} = \underset{a,v,u,w\in A}{\mathrm{argmin}}\left\{\frac{1}{2}\|Tv - E\|_2^2 + R(u) + I_+(w) + \frac{\mu_1}{2}\left\|O'a - v + \frac{\gamma_1}{\mu_1}\right\|_2^2 + \frac{\mu_2}{2}\left\|a - u + \frac{\gamma_2}{\mu_2}\right\|_2^2 + \frac{\mu_3}{2}\left\|a - w + \frac{\gamma_3}{\mu_3}\right\|_2^2\right\}. \tag{S12}$$

3D transform domain by combining the sliding-window transform process with block-matching. In the sliding process, blocks with similar spatial features and intensity levels are selected using block-matching. These matched blocks are stacked to form a 3D array, and the data in the array exhibit high correlation. Then, a 3D de-correlating unitary transformation is applied to exploiting this correlation and effectively attenuating the noise by reducing the transform coefficients. Finally, using an inverse 3D transformation, all matched blocks are estimated. This procedure is repeated for each sliding window, and the final estimate is computed as a weighted average of all of those overlapping estimates.

Next, the algorithm iteratively updates primal variables, estimated solution $a^{j+1}$ (j denotes the iteration index), and penalty parameters. The algorithm stops once the following two conditions about the estimated results and penalty parameters are met as follows:

$$\eta = \frac{\|a^{j+1} - a^j\|_2}{\|a^j\|_2} < \rho \tag{S13.1}$$

and $$\mu_i^{j+1} = \mu_i^j \tag{S13.2}$$

$(i = 1, 2, 3)$

Here, ρ (0<ρ≤10⁻³) is the pre-set tolerance value.

Supplementary Note 3: Details on the Calibration of Swept Coded Aperture Real-Time Femtophotography (SCARF)'s Spatial Encoding Operation.

Using the operations of time-spectrum mapping, spectral shearing, and spatial encoding, swept coded aperture real-time femtophotography (SCARF) tags each frame of the dynamic scene with a unique "barcode", which provides the prior information that allows the spatiospectral mixing of adjacent frames to be recovered by the PnP-ADMM algorithm. Due to various imperfections induced in fabrication, the actual encoding mask is different from the binary mask in design. Therefore, calibration of spatial encoding operation is necessary to obtain accurate information for the operator C in the image reconstruction.

Figure 6C:
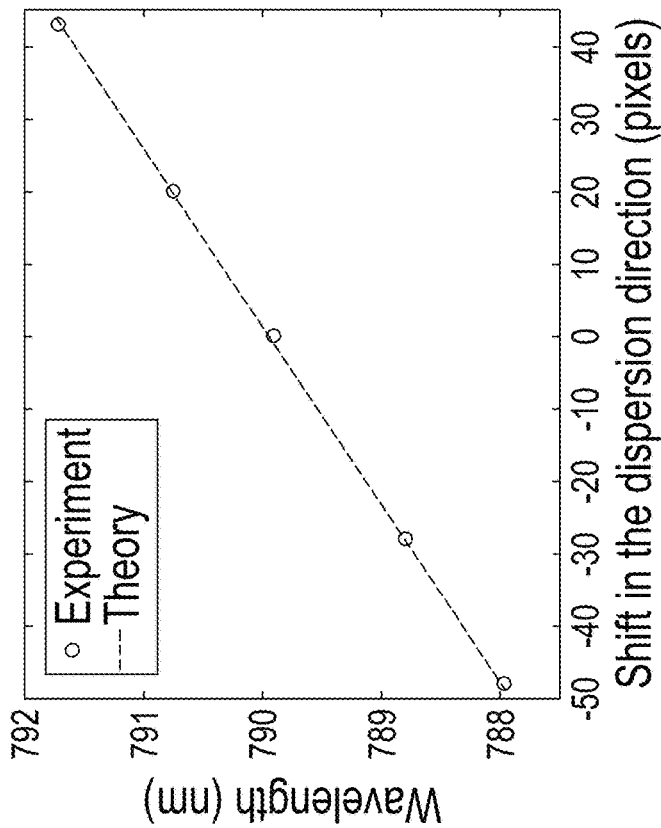
FIG. 6C shows shifts in the spectral shearing direction of the images acquired in FIG. 6B versus the calibration wavelengths.
Figure 6A:
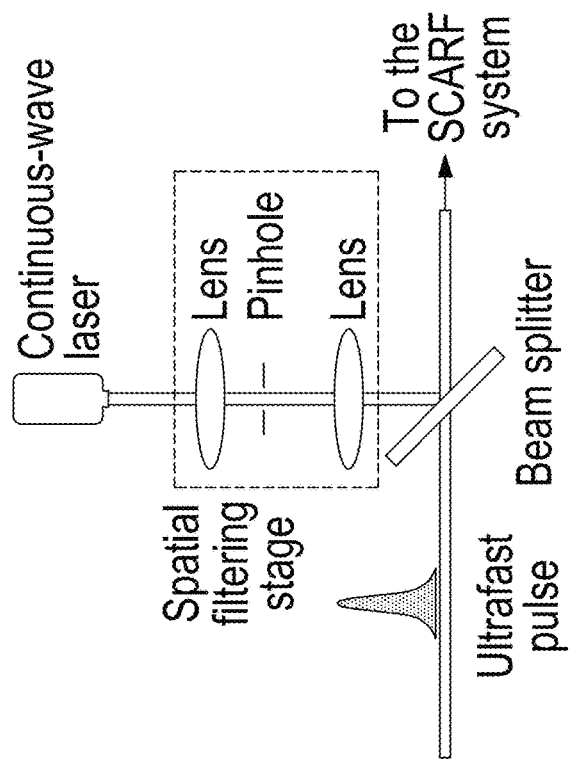
FIG. 6A is a schematic view of a system according to an embodiment of an aspect of the present disclosure.

This calibration is conducted using the following method. As shown in FIG. 6A, an additional beamline is built with a continuous-wave (CW) diode laser (MDL-III-793 nm-2W, CNI), whose output wavelength was tunable from 787.96 nm to 791.72 nm. The beam went through a spatial filtering stage to generate a Gaussian beam, whose size was similar to that of the ultrafast laser pulse. Then, this illumination was coupled into the swept coded aperture real-time femtophotography (SCARF) system and aligned the paths of the CW laser beam to be collinear with that of the chirped ultrashort pulse.

Figure 6B:
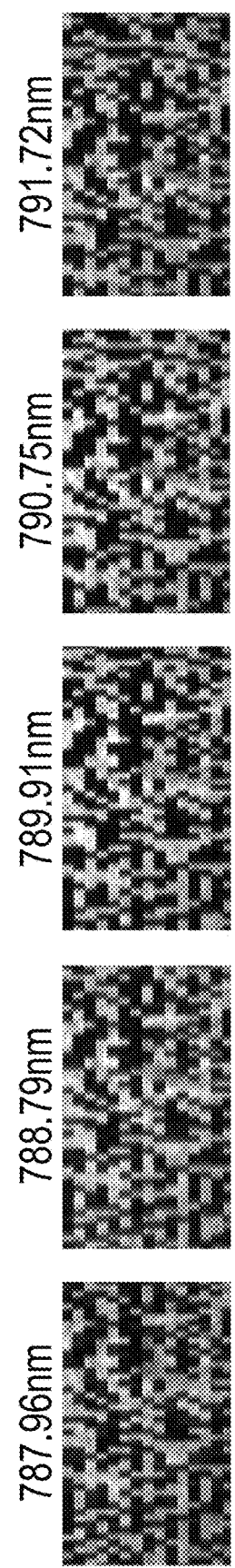
FIG. 6B shows images of the encoding mask by the swept coded aperture real-time femtophotography (SCARF) system illuminated by five selected wavelengths for calibration.

The images of the coded aperture were acquired at five wavelengths within the spectrum range of the chirped ultrashort probe pulse. After binarization, these images were used as c[m, n] for image reconstruction. As shown in FIG. 6B, these mask images have a high resemblance, suggesting a negligible distortion. Besides, the shift in the spectral shearing direction were calculated versus calibration wavelengths using a cross-correlation-based image registration algorithm. As shown in FIG. 6C, this result proves that the swept coded aperture real-time femtophotography (SCARF) system introduces a linear dispersion within the spectral range of the ultrashort probe pulse.

Supplementary Note 4: Comparison of Swept Coded Aperture Real-Time Femtophotography (SCARF) with Representative Methods in Single-Shot Compressed Temporal Imaging.

The comparison of swept coded aperture real-time femtophotography (SCARF) with four representative methods in single-shot compressed temporal imaging is summarized in FIG. 13. In particular, both swept coded aperture real-time femtophotography (SCARF) and coded-aperture compressive temporal imaging (CACTI) use pixel-wise encoding to record temporal information. Their acquired snapshots have the same compression ratio, and their reconstructed movies have similar sequence depths. However, coded-aperture compressive temporal imaging (CACTI) uses a moving translation stage or a spatial light modulator to generate the sweeping coded aperture, so that to its highest imaging speed ever demonstrated is limited to about 5 kfps. In contrast, leveraging the difference in the numbers of shearing operations that are applied to the scene and the mask, swept coded aperture real-time femtophotography (SCARF) allows the sweeping of a static coded aperture at an ultrafast speed. In particular, this sweeping speed can be determined by $v_s=d/\beta\Delta\lambda_{FP}$, and swept coded aperture real-time femtophotography (SCARF)'s frame rate can thus be determined by $r=v_s/d$. Given the specifications (see hereinabove and FIG. 12), the highest sweeping speed is calculated to be $v_s=1.72\times10^9$ m/s, which leads to swept coded aperture real-time femtophotography (SCARF)'s highest imaging speed of $r=156.3$ Tfps. This method enables swept coded aperture real-time femtophotography (SCARF) to increase the imaging speed for more than 10 orders of magnitude compared to coded-aperture compressive temporal imaging (CACTI). It is noted that coded-aperture compressive temporal imaging (CACTI) has been implemented with varied technical configurations. The one selected in FIG. 13 has the highest imaging speed and sequence depth. Finally, a metric termed data acquisition capability, defined as $F=rN_t$, was used to synthetically consider the imaging speed and the sequence depth. A larger value of F indicates the system can capture a longer sequence depth at a higher imaging speed. Using this metric, compared to coded-aperture compressive temporal imaging (CACTI), swept coded aperture real-time femtophotography (SCARF) improves the data acquisition capability by over $2.1\times10^{10}$ times.

The multiple-aperture compressed sensing (MA-CS) CMOS sensor uses a 5×3 lens array to optically generate a total of 15 replicated images of the dynamic scene. Each replicated image is formed onto a CMOS sensor (64×108 pixels). Each CMOS sensor uses a unique binary random code sequence as a flutter shutter for temporal modulation. A compressed sensing-based algorithm is used to produce a movie with an imaging speed of $r=200$ million fps and a sequence depth of $N_t=32$, which leads to $F=6.4\times10^{-3}$ frames Tfps. Thus, compared to swept coded aperture real-time femtophotography (SCARF), the MA-CS CMOS method has considerably lower specifications in the sequence depth, compression ratio, field of view (FOV), and data acquisition capability.

Compressed ultrafast spectral-temporal (CUST) photography and compressed ultrafast spectral photography (CUSP) are developed based on the imaging model of compressed ultrafast photography (CUP). Similar to swept coded aperture real-time femtophotography (SCARF), both CUST photography and compressed ultrafast spectral photography (CUSP) use a single chirped pulse as illumination and a static coded aperture for spatial encoding to achieve imaging speeds at the Tfps level. However, in their models of data acquisition, only a single spectral shearing operation is applied to both the dynamic scene and the coded aperture. Consequently, pixel-wise encoding with the same depth cannot be realized across the imaging field of view (FOV). Meanwhile, shearing the dynamic scene induces anisotropy in spatial resolutions and loses the prior knowledge to delineate the region of the dynamic scene. Finally, this data acquisition scheme brings in a trade-off between the imaging field of view (FOV) and the sequence depth, which hence reduces the compression ratio. In contrast, swept coded aperture real-time femtophotography (SCARF) applies the spatial encoding operation between two spectral shearing operations with opposite directions. This new image acquisition paradigm successfully breaks all aforementioned limitations. The knowledge of the region of the dynamic scene and the preservation of the isotropy in spatial resolutions enhance the reconstructed image quality. Implemented with a chirped ultrashort pulse, swept coded aperture real-time femtophotography (SCARF) exceeds the imaging speeds in all single-shot compressed sensing femtophotography while maintaining a good sequence depth.

To demonstrate the superior performance of swept coded aperture real-time femtophotography (SCARF) to compressed ultrafast photography (CUP), the reconstructed image qualities were compared using a simulated dynamic event, namely, a static spoke pattern whose intensity changed as a Gaussian function (Supplementary FIG. 2A). The event datacube had a sequence depth of 21 frames, each of which had 512×512 (x, y) pixels. The simulated snapshot using the forward models of compressed ultrafast photography (CUP) and swept coded aperture real-time femtophotography (SCARF) are shown in FIG. 7B, 7C, respectively. Also shown as insets in FIGS. 7A-7C are the zoom-in views of the center of these images. For compressed ultrafast photography (CUP), because the shearing operation is applied to both the scene and the coded aperture, the captured snapshot loses certain spatial features in the shearing direction. Besides, the snapshot cannot indicate the region of occurrence of the dynamic scene. In contrast, the snapshot captured by swept coded aperture real-time femtophotography (SCARF) shows the preservation of all spatial features of this spoke pattern.

Figure 7J:
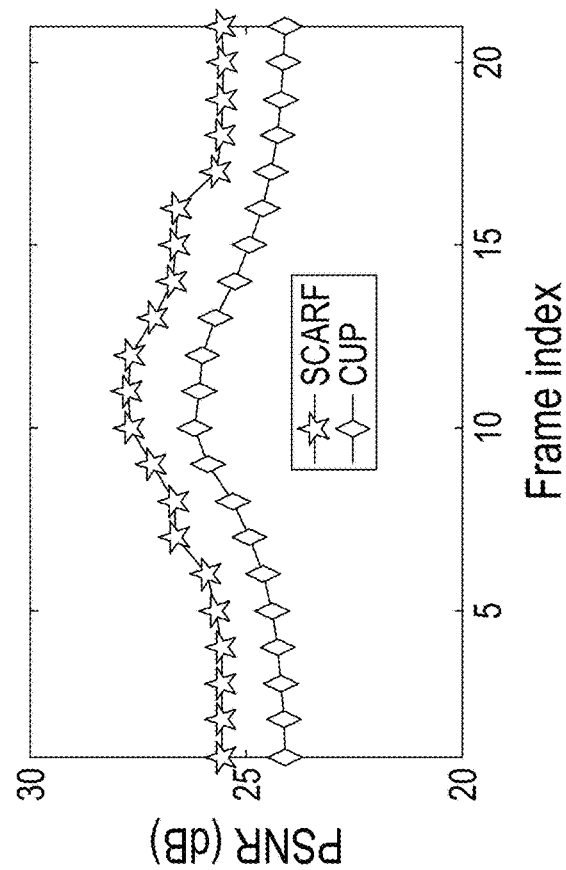
FIG. 7I and FIG. 7J show structural similarity index measure (SSIM) and peak signal-to-noise ratio (PSNR) of each frame reconstructed by compressed ultrafast photography (CUP) and swept coded aperture real-time femtophotography (SCARF)
Figure 7I:
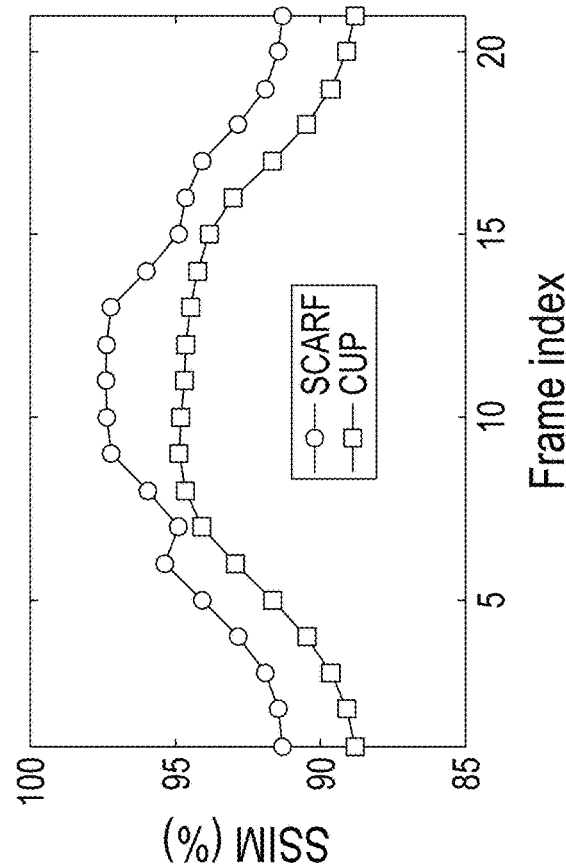

Both simulated snapshots (see Supplementary FIGS. 2B, 2C) were reconstructed by using the PnP-ADMM algorithm with the optimal parameters in each case. The reconstructed images are compared in FIG. 7D, 7E, which show the 11th frames of the reconstructions of compressed ultrafast photography (CUP) and swept coded aperture real-time femtophotography (SCARF). To further evaluate the performance, their noise-limited bandwidth at the 3σ threshold above the average background was analyzed, where σ is the noise defined by the standard deviation of the background. These results were compared with the ground truth, as shown in FIGS. 7F-7H. The results reveal that swept coded aperture real-time femtophotography (SCARF)'s spatial resolution decreases by 12.3% in both the x and the y directions. In comparison, compressed ultrafast photography (CUP)'s spatial resolution decreases by 13.1% in the x direction and 48.6% in the y direction. Therefore, compared to compressed ultrafast photography (CUP), swept coded aperture real-time femtophotography (SCARF) has a higher spatial resolution and avoids resolution anisotropy. Finally, to quantitatively assess the quality of reconstructed videos, the structural similarity index measure (SSIM) and peak signal-to-noise ratio (PSNR) frame by frame were analyzed (FIGS. 7I, 7J). The swept coded aperture real-time femtophotography (SCARF) reconstruction shows a better performance in each frame in both metrics. Compared to compressed ultrafast photography (CUP), swept coded aperture real-time femtophotography (SCARF) improves the SSIM by 2.2% on average and enhances the PSNR by 2.0 dB on average. These results demonstrate that swept coded aperture real-time femtophotography (SCARF) can accurately reconstruct dynamic scenes from compressively acquired snapshots.

Supplementary Note 5: Comparison of Swept Coded Aperture Real-Time Femtophotography (SCARF) with Sequentially Time all-Optical Mapping Photography (STAMP)

The comparison of swept coded aperture real-time femtophotography (SCARF) with sequentially time all-optical mapping photography (STAMP) is summarized in FIG. 14. Akin to other time-stretching methods, both swept coded aperture real-time femtophotography (SCARF) and sequentially timed all-optical mapping photography (STAMP) leverage time-spectrum mapping to attach temporal information in a dynamic scene to different wavelengths. The data acquisition in both modalities is built upon optical signal processing in the spectral domain, rather than in the temporal domain. As a result, both swept coded aperture real-time femtophotography (SCARF) and sequentially timed all-optical mapping photography (STAMP) can record ultrafast events without using ultrafast detectors. Meanwhile, the data acquisition and image reconstruction stay the same for different imaging speeds. Thus, the imaging speed can be tuned in a wide range by simply changing the duration of the linearly chirped pulse.

Swept coded aperture real-time femtophotography (SCARF) separates from sequentially timed all-optical mapping photography (STAMP) in the following aspects. Conceptually, swept coded aperture real-time femtophotography (SCARF) integrates compressed sensing with time stretching in data acquisition. This computational imaging method results in a different system design. In particular, swept coded aperture real-time femtophotography (SCARF) allows using continuous chirped pulse, rather than a limited number of daughter pulses used in sequentially timed all-optical mapping photography (STAMP). From the standpoint of instrumentation, swept coded aperture real-time femtophotography (SCARF) needs neither the temporal mapping device nor the spatial mapping device (SMD) in the sequentially timed all-optical mapping photography (STAMP) system. The system configuration becomes much simpler. The symmetrical configuration in swept coded aperture real-time femtophotography (SCARF) is also more resilient to chromatic aberration induced by the probe pulse's bandwidth. Moreover, sequentially timed all-optical mapping photography (STAMP) must record each daughter pulse at a different position on the sensor. This requirement induces an inherent trade-off issue between the field of view (FOV) and sequence depth. In contrast, the intermix of spatial and temporal information in swept coded aperture real-time femtophotography (SCARF)'s data acquisition nullifies the need for sensor-plane division performed in sequentially timed all-optical mapping photography (STAMP), which has increased the (x, y) field of view (FOV) and made it independent of the sequence depth. Finally, the sequence depth of sequentially timed all-optical mapping photography (STAMP) is limited by the number of channels in the periscope array of the spatial mapping device (SMD). Therefore, the design complexity and cost will be increased according to the sequence depth. In contrast, swept coded aperture real-time femtophotography (SCARF)'s data acquisition is independent of the sequence depth. The different system design and instrument implementation in swept coded aperture real-time femtophotography (SCARF) leads to the considerate improvement in system specifications. Compared to sequentially timed all-optical mapping photography (STAMP), swept coded aperture real-time femtophotography (SCARF) enhances the imaging speed by more than 35 times, the sequence depth by 22 times, and the (x, y) field of view (FOV) by more than 5 times.

Figure 8G:
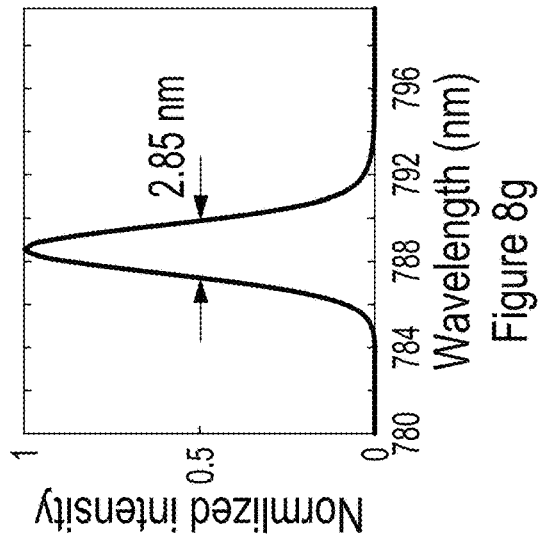
FIG. 8G, FIG. 8H and FIG. 8I show spectral density profiles.
Figure 8H:
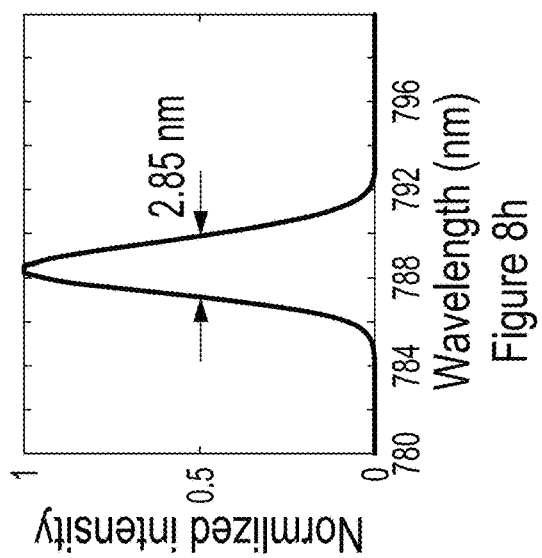
Figure 8I:
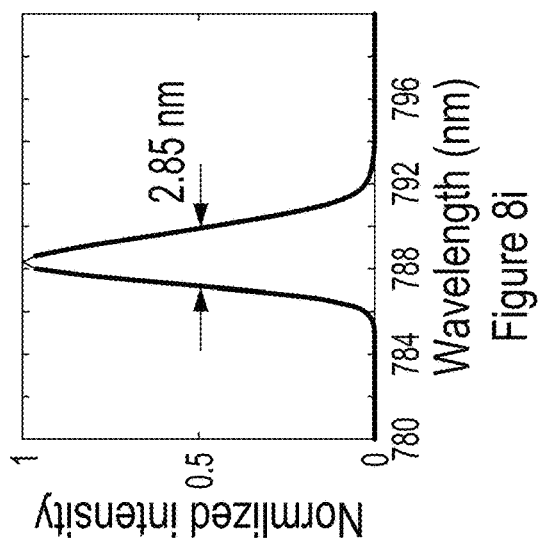
Figure 8J:
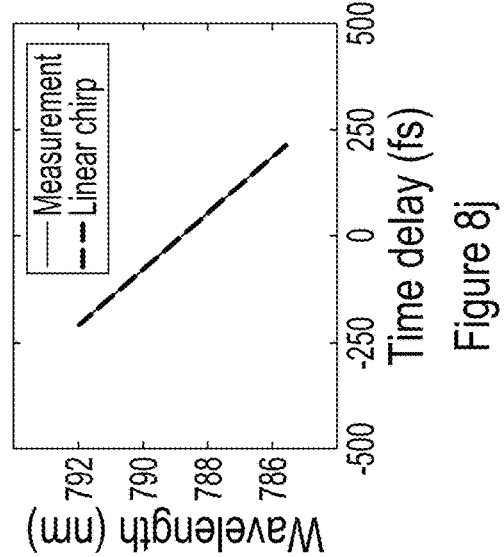
FIG. 8J, FIG. 8K and FIG. 8L show relation between the wavelength and time of the chirped pulses, dashed lines representing perfectly linear chirping.
Figure 8K:
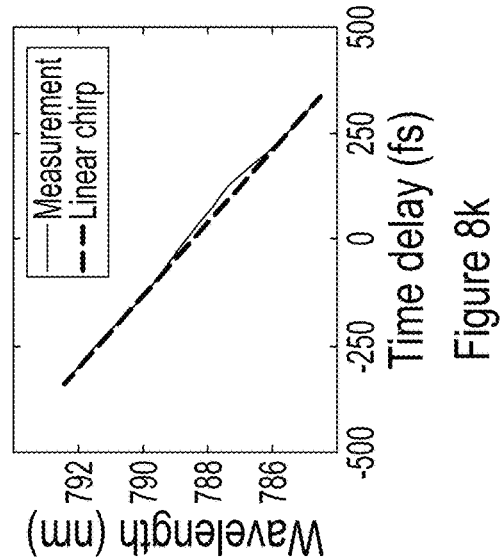
Figure 8L:
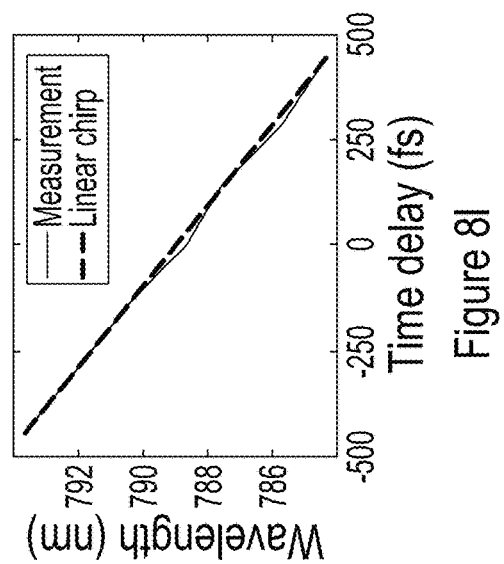

Supplementary Note 6: Second Harmonic Generation Frequency-Resolved Optical Gating (SHG-FROG) Measurements of Chirped Pulses The second harmonic generation (SHG) frequency-resolved optical gating (FROG) method was implemented to characterize the linear chirp of the ultrashort laser pulses. In particular, a replica of the incident pulse was generated by a beam splitter, and then both pulses were focused on a beta barium borate crystal to generate a second harmonic signal that was only present when both pulses overlapped in space and time. An optical delay line generated variable delays between the two pulses. The resulting time-dependent second harmonic signal was recorded by a spectrometer. The pulse duration was retrieved from the measured spectrogram by a retrieval algorithm. FIGS. 8A-8C show the retrieved second harmonic generation frequency-resolved optical gating (SHG-FROG) measurements of the three chirped ultrashort pulses used for swept coded aperture real-time femtophotography (SCARF)'s proof-of-concept experiments (see FIG. 2 and the associated text). The reconstructed intensity and phase of the three ultrafast pulses are shown in FIGS. 8D-8F, whose pulse durations are quantified to be 362 fs, 561 fs, and 739 fs, respectively. Despite different pulse durations, their spectral widths are maintained, as shown in FIGS. 8G-8I. Finally, the linear relationship between the spectrum and time of these pulses was verified, as shown in FIGS. 8J-8L.

Figure 9B:
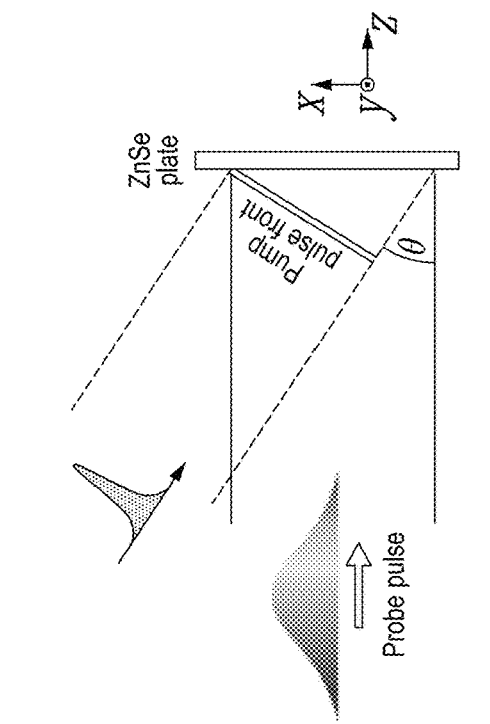
FIG. 9B shows a geometry of generating and probing the femtosecond laser-induced ultrafast absorption phenomenon on the ZnSe plate.
Figure 9A:
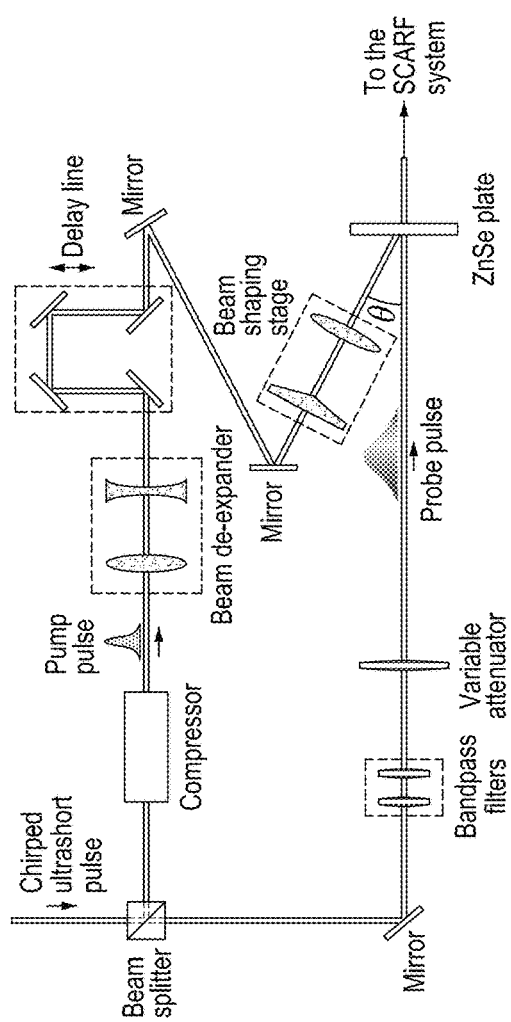
FIG. 9A is a schematic view of a system according to an embodiment of an aspect of the present disclosure, with a beam de-expander consisting of a 300 mm-focal-length convex lens and a 100 mm-focal-length concave lens, and an optical delay line controlled by a precision translation stage.

Supplementary Note 7: Details on Swept Coded Aperture Real-Time Femtophotography (SCARF) of Ultrafast Absorption in a Semiconductor FIG. 9A shows the detailed schematic of the experimental system for imaging femtosecond laser-induced ultrafast absorption of ZnSe by swept coded aperture real-time femtophotography (SCARF). A chirped pulse (28 ps pulse width, 1 mJ energy, 788.8 nm central wavelength) was split into two components by a beam splitter (BS1-800-70-2012-45P, CVI Laser Optics). The reflected component was compressed by a two grating-based compressor to generate the pump pulse of 40 fs FWHM duration. Then, it went through a beam de-expansion stage, consisting of a 300 mm-focal-length plano-convex lens (LA1484-B, Thorlabs) and a 100 mm-focal-length plano-concave lens (LC1120-B, Thorlabs), and an optical delay line (providing a tunable delay of −0.845 ps-0.845 ps). Afterward, the pump pulse passed through a beam shaping stage, consisting of an axicon lens (130-0278, Eksma optics, with a 178° apex angle and a 100 mm-focal-length lens (LA1509-B, Thorlabs)] to generate an ellipse on a ZnSe plate with the incident angle of θ=35.4°. The pump pulse induced ultrafast absorption dynamics in ZnSe, which caused a drop in its optical transmissivity.

The transmitted component went through the two bandpass filters for bandwidth adjustment and a variable attenuator (NDC-50C-2M, Thorlabs) for intensity adjustment. Then, this generated probe pulse illuminated the ZnSe plate to record this transient event for swept coded aperture real-time femtophotography (SCARF). FIG. 9B shows the layout for observing this phenomenon in a single shot. The oblique incidence and the elliptic shape of the pump pulse induce a delay of the onset of the absorption in 2D. In this way, the transmitted probe pulse revealed the propagation of the structured absorption front on the surface of the ZnSe plate.

The modeling the propagation of the absorption front on the ZnSe plate will now be described. By traversing through the beam shaping stage, the pump pulse generates a circle whose radius is denoted by $r_a$. Because of the oblique incidence, the generated circle is projected to an ellipse (inset in FIG. 3C). The short axis, whose direction is perpendicular to the plane of the incident, has a radius of $r_y=r_a$. The long axis, within the plane of the incident, has a radius of $r_x=r_a/\cos\theta$. This ellipse is expressed as follows:

$$\frac{x^2}{r_x^2} + \frac{y^2}{r_y^2} = 1. \tag{S14}$$

Because of the flat front of the pump pulse, on the x axis, the location of the absorption front moves superluminally as a function of time as follows:

$$x = \frac{r_a}{\cos\theta} - \frac{ct'}{\sin\theta}. \quad \text{(S15)}$$

Here, the local time t' ranges from 0 to $(2r_a \tan\theta/c)$. Plug Relation (S15) into Relation (S14), the location of the absorption front on the y axis is determined as follows:

$$y = \sqrt{\frac{ct'}{\tan\theta}\left(2r_a - \frac{ct'}{\tan\theta}\right)}. \quad \text{(S16)}$$

Velocities of the top and the bottom traces of the absorption front can be calculated as follows:

$$v_{tx} = v_{bx} = -\frac{c}{\sin\theta}\hat{x}, \text{ and} \quad \text{(S17)}$$

$$v_{ty} \text{ and } v_{by} = \pm\sqrt{\frac{c}{t'\tan\theta\left(2r_a - \frac{ct'}{\tan\theta}\right)}}\left(r_a - \frac{ct'}{\tan\theta}\right)\hat{y}.$$

For additional data, in another experiment, the beam shaping stage in the experimental system (see FIG. 9A) was replaced with a 650 mm-focal-length cylindrical lens, which focused a femtosecond pump pulse (40 fs FWHM duration, 124 µJ pulse energy) to a line on the ZnSe plate with the incident angle of θ=about 2°. This configuration induced ultrafast absorption dynamics in ZnSe, whose absorption front propagated with a superluminal velocity of $v_1=8.6\times10^9$ m/s in the −x direction. A chirped pulse (530 fs FWHM duration, 6.6 nm FWHM bandwidth) probed this event from a field of view (FOV) of about 1 mm×1 mm. The high pulse energy permanently damaged the sample after a single shot. Swept coded aperture real-time femtophotography (SCARF) imaged this non-repeatable dynamic scene at 156.3 Tfps.

All reconstructed frames are presented in FIG. 9C. Line profiles of the absorption front from two adjacent frames are plotted in FIG. 9D. An analysis using cross correlation revealed that the decrease of transmissivity propagated 54.3 µm in 6.4 fs. The corresponding propagation speed was calculated to be $8.5\times10^9$ m/s, which shows an excellent agreement with the theory.

It is worth pointing out that this result cannot be achieved by using the state-of-the-art compressed ultrafast spectral photography (CUSP) method. Depicted in FIG. 9E, these frames correspond to an imaging speed is 78.2 Tfps. The result shows no temporal information within the 12.8 fs time interval. Further analysis shows that the minimal resolvable propagation distance of the absorption front is 121.6 µm (FIG. 9F). Compressed ultrafast spectral photography (CUSP)'s system specifications are even lower than the results shown in FIGS. 9E-9F. With the highest imaging speed of 70 Tfps, compressed ultrafast spectral photography (CUSP)'s minimum interframe time interval is 14.3 fs. During this time, the absorption front propagates 123.0 µm. Thus, compressed ultrafast spectral photography (CUSP) is insufficient to distinguish the different onsets of absorption in any spatial points within this distance. In summary, this experiment demonstrates that swept coded aperture real-time femtophotography (SCARF)'s highest imaging speed can be applied to a realistic sample to capture a non-repeatable ultrafast light-matter interaction. More importantly, it proves that swept coded aperture real-time femtophotography (SCARF) exceeds the imaging capability of the state-of-the-art in resolving fine spatiotemporal details in ultrafast events.

Supplementary Note 8: Details on swept coded aperture real-time femtophotography (SCARF) of transient birefringence in a Kerr medium. FIG. 10 shows the detailed schematic of the experimental system of imaging ultrashort laser pulse-induced birefringence in a $Bi_4Ge_3O_{12}$ (BGO) crystal. The chirped ultrashort pulse with p-polarization was split into two components by a beam splitter (BS1-800-70-2012-45P, CVI Laser Optics). The reflected component was first cleaned by a polarizer (P0, LPNIR100-MP2, Thorlabs), the pump pulse then passed through the compressor, beam de-expander, and the optical delay stage whose specifications were the same as those used in the experiment of imaging the ultrafast absorption on a semiconductor (see Supplementary Note 7). The generated pump pulse then went through two cylindrical lenses whose focal lengths are 500 mm (for CL1) and 300 mm (for CL2) and a half-wave plate (HWP1), which generated a 0.8 mm×0.15 mm profile with the s-polarization that propagated inside the BGO crystal. The transmitted components went through a half-wave plate (HWP2, WPH10M-780, Thorlabs) to adjust its linear polarization angle to +45°, which was aligned with the polarization axis of the polarizer P1. Its pulse width and intensity were adjusted by the bandpass filters and the variable attenuator that were described in Supplementary Note 7. The generated probe pulse illuminated the sample with normal incidence. Another polarizer (P2) with a polarization axis at −45° was placed behind the BGO crystal for cross-polarization detection.

When the pump pulse and the probe pulse coincided in the BGO crystal, the birefringence caused by the pump pulse rotated the polarization of the probe pulse, allowing a portion of the light to transmit through P2. The transmission of the probe pulse is given as follows:

$$T_{Kerr} = \sin^2\left(\frac{\Delta\varphi}{2}\right)\sin^2(2\Delta\theta_p), \quad \text{(S18)}$$

where $\Delta\varphi$ is the phase shift experienced by the probe pulse, and $\Delta\theta_p$ is the angular difference of the polarization states between the pump and probe pulses. According to Relation (S18), HWP2 was set $\Delta\theta_p=45°$ to maximize the contrasts in the acquired snapshot.

Supplementary Note 9: Details on Swept Coded Aperture Real-Time Femtophotography (SCARF) of Ultrafast Demagnetization of an Alloy Film.

Figure 11A:
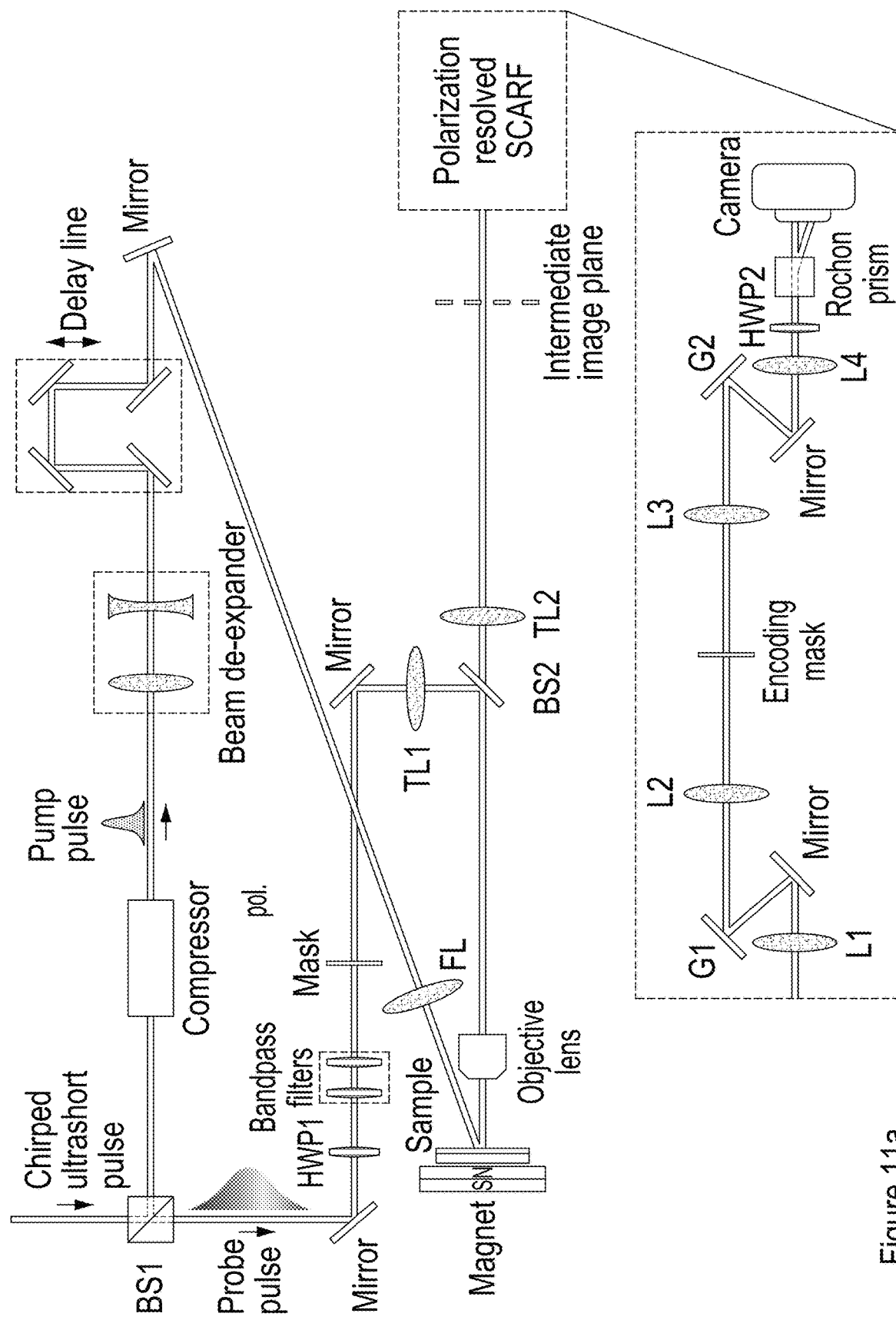
FIG. 11A is a schematic view of a system according to an embodiment of an aspect of the present disclosure, the inset showing a schematic view of the polarization-resolved swept coded aperture real-time femtophotography (SCARF) system, where BS1-BS2: beam splitters; G1-G2: gratings; HWP1-HWP2: half-wave plates; FL: focusing lens; L1-L4: lenses; P0-P2: polarizers; TL1-TL2: tube lenses.
Figure 11C:
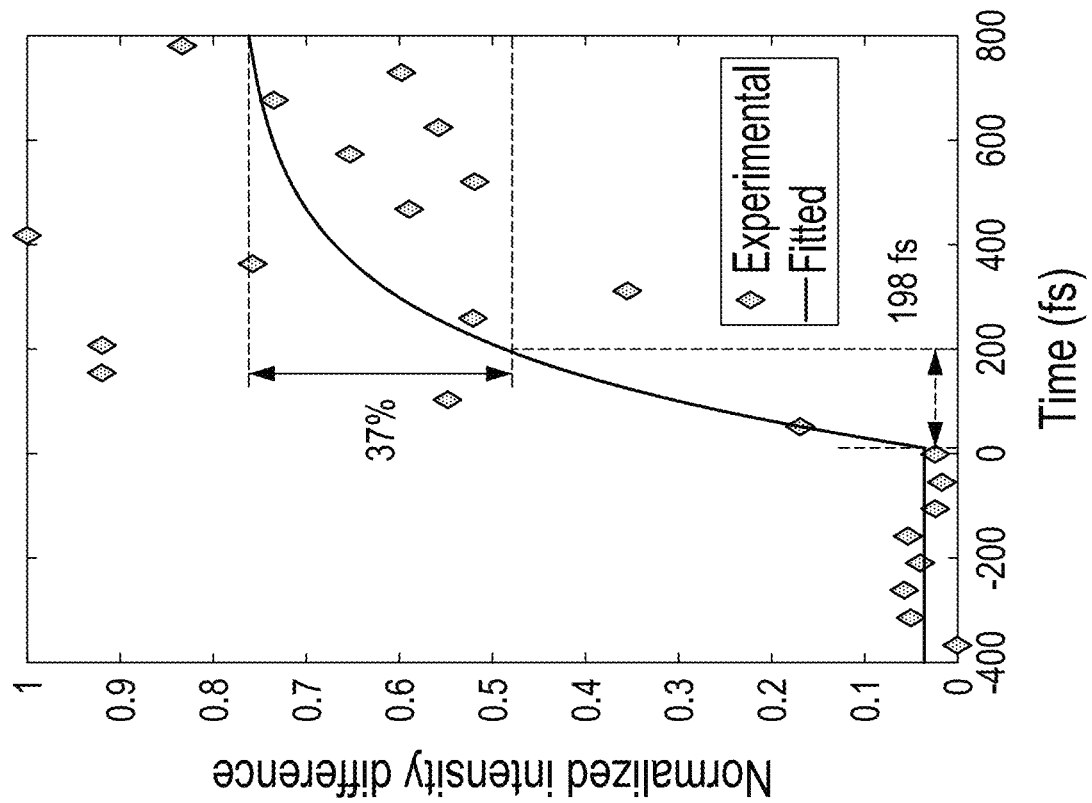
FIG. 11C shows time-resolved intensity difference between the s- and p-polarization light measured by the multiple-shot experiment showing the averaged intensity from the two selected areas in the swept coded aperture real-time femtophotography (SCARF) measurement.

FIG. 11A shows the detailed schematic of the experimental system of ultrafast laser-induced demagnetization of a GdFeCo alloy film. A chirped ultrashort pulse with p-polarization was split into two components by a beam splitter. Using the same method described in Supplementary Notes 7-8, the reflected component generated the pump pulse (40 fs pulse duration and 6.4 uJ pulse energy), which was then loosely focused by a 600 mm-focal-length lens to a spot with a diameter of 115 µm that was obliquely incident onto the GdFeCo sample at the angle of incidence of θ=37°. The transmitted component was used to generate a probe pulse (1.2 ps pulse duration, 0.4 uJ pulse energy). Then, it went through a mask (see the inset in FIG. 5A), which was imaged onto the sample by a tube lens and a 20×objective lens.

The reflected probe pulse was collected by the same objective lens and a tube lens to form an image at an intermediate image plane that interfaced with the polarization-resolved swept coded aperture real-time femtophotography (SCARF). As shown in the inset of FIG. 11A, a half-wave plate (WPH10M-780, Thorlabs) and a Rochon prism (PLM 10, B. Halle Nachfl. GmbH) were placed between lens L4 and CCD camera. Thus, the s-polarization and the p-polarization components of the reflective probe pulse land at two different spatial positions of the CCD camera. The polarization axis of this prism was aligned to +45° to obtain equal intensities of the s- and p-polarized components of the reflective probe pulse.

A permanent magnet was placed behind the GdFeCo film. The pump pulse induced an ultrafast demagnetization process to the film, which changed the polarization angle of the reflected probe pulse. This magneto-optical Kerr effect was reflected in intensity changes in the s- and p-polarized components.

Figure 11B:
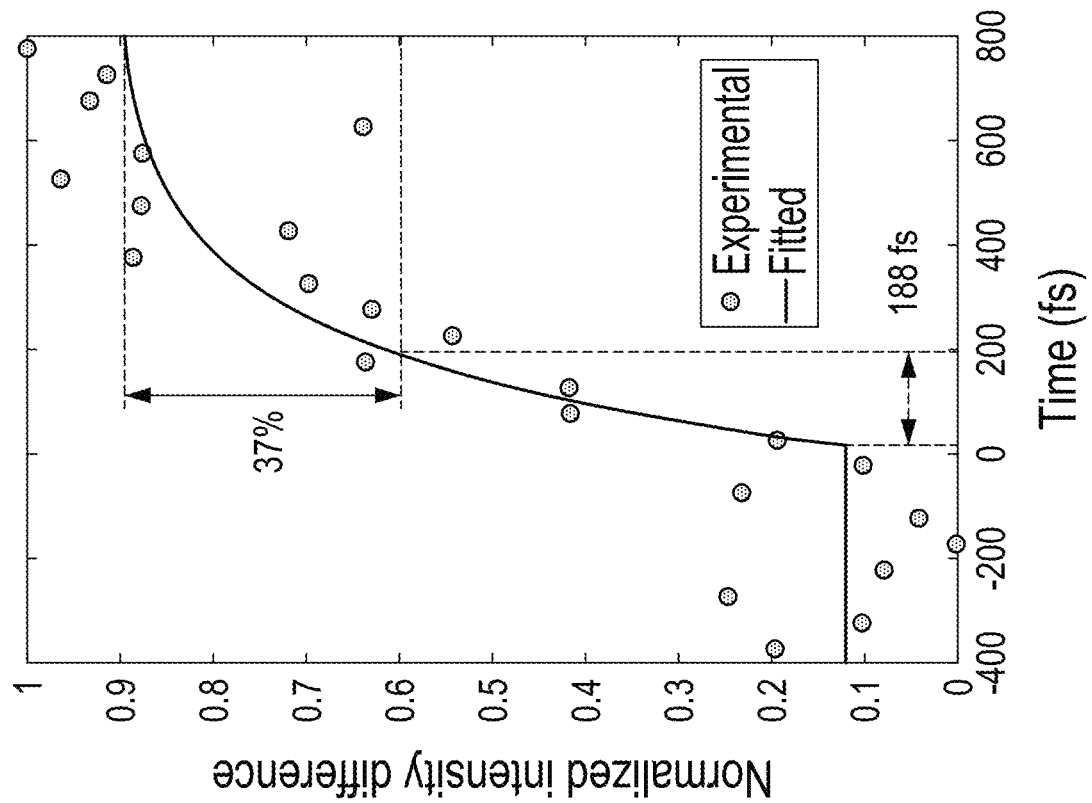
FIG. 11B shows time-resolved intensity difference between the s- and p-polarization light measured by the multiple-shot experiment.

In multiple-shot scanning-based experiment, to verify swept coded aperture real-time femtophotography (SCARF)'s result using a gold standard, a scanning-based multiple-shot experiment was performed (FIG. 11B). The sample preparation, the reflection-mode system, and the polarization-resolved detection were kept the same as those in the swept coded aperture real-time femtophotography (SCARF)'s measurement. Different from the swept coded aperture real-time femtophotography (SCARF)'s experimental system, the 40-fs pump pulse was focused to a spot of about 100 µm in diameter on the sample with an incident angle of about 5°, and a 40-fs unchirped pulse was used as the probe pulse. The difference between the s- and the p-polarized components of the reflected probe light was directly detected by a balanced photodiode detector (PDB220A2, Thorlabs). The step of delay time between the pump and probe pulse was set to 50 fs. Each measurement was averaged three times.

For fitting the time courses of normalized intensity difference during demagnetization, the measurements from the swept coded aperture real-time femtophotography (SCARF) system and the multiple-shot experiment were fitted as follows:

$$\Delta M(t) = U - H(t - t_{ON}) \times B\left[1 - \exp\left(-\frac{t - t_{ON}}{\tau_{dm}}\right)\right]. \quad (S19)$$

Here, U describes the baseline. H(•) represents the Heaviside function. $t_{ON}$ is the onset time point of the demagnetization. The demagnetization time, $\tau_{dm}$, is defined as the time between $t_{ON}$ and when the normalized intensity difference reaches 63% of the maximum value. B is the amplitude constant of the function $$\left[1 - \exp\left(-\frac{t - t_{ON}}{\tau_{dm}}\right)\right].$$

Based on the fitting results, for Swept coded aperture real-time femtophotography (SCARF) measurements shown in FIG. 5C, the demagnetization times of Bar 1 and Bar 2 were quantified to be 186±21 fs and 187±20 fs, respectively. The onset times $t_{ON}$ for Bar 1 and Bar 2 were determined to be −3±15 fs and 33±11 fs, respectively. Thus, the onset difference between these two areas was 36 fs. For the results of the multiple-shot experiment, the demagnetization time was quantified to be 188 fs. This excellent agreement verifies the swept coded aperture real-time femtophotography (SCARF)'s imaging ability The scope of the claims should not be limited by the embodiments set forth in the examples but should be given the broadest interpretation consistent with the description as a whole.

The invention claimed is:

1. A method for imaging of a dynamic scene, comprising data acquisition and image reconstruction from acquired data;
   said data acquisition comprising imaging the scene using a single chirped pulse; time-spectrum mapping (M) when the single chirped pulse probes the dynamic scene and storing temporal information at different wavelengths, spectral shearing, spatial encoder and reverse spectral shearing; and spatiotemporal integration; and
   said image reconstruction comprising processing a resulting captured snapshot by a computer;
   yielding an image of the dynamic scene; by:
   illuminating the scene with a single ultrafast probe pulse from a laser; a first spectral shearing(S) of the dynamics scene; spatial encoder (C), a second spectral shearing in a reverse direction (S'); and spatiotemporal integration of a resulting spatially encoded dynamic scene, yielding a captured snapshot E[m,n] linked with transmittance modulated by the dynamic scene a(x,y,t) as follows: E[m,n]=O a(x,y,t), (x,y,t) being a datacube of the dynamic scene, T being an exposure time, m and n being pixel indices of a detector, and O an operator O=TS'CSM.

2. The method of claim 1, comprising processing the resulting captured snapshot by the computer by building a sparse matrix of operations of said data acquisition; creating an initialization based on a forward model; and solving an optimization problem to recover the image of the dynamic scene.

3. The method of claim 1, further comprising processing the resulting captured snapshot by the computer by building a sparse matrix of operations of said data acquisition; creating an initialization based on a forward model; and solving an optimization problem to recover the datacube (x,y,t) of the dynamic scene.

4. The method of claim 1, further comprising processing the resulting captured snapshot by the computer by building a sparse matrix of operations of said data acquisition; creating an initialization based on a forward model; and solving an optimization problem to recover the datacube (x,y,t) of the dynamic scene as follows:

$$\hat{a} = \underset{a \in A}{\operatorname{argmin}}\left\{\frac{1}{2}\|Oa - E\|_2^2 + R(a) + I_+(a)\right\}$$

where $\|\cdot\|_2$ represents a $l_2$ norm;

$$\frac{1}{2}\|Oa - E\|_2^2$$

is a fidelity term representing a similarity between measurement and estimated result; R (•) is an implicit regularizer that promotes sparsity in the dynamic scene; $I_+(\cdot)$ represents a non-negative intensity constraint.

5. The method of claim 1, comprising directing the probe pulse transmitted by the scene to a first 4f imaging system and an encoder, a first spectral dispersion shearing temporal information that is contained in wavelengths to different positions for spatial encoder by the encoder; relaying the probe pulse to a detector using a second 4f imaging system, the second 4f imaging system providing a second spectral shearing in a reverse direction relative to the first 4f imaging system; and recording a compressed snapshot of the temporal information of the scene by the detector.

6. The method of claim 1, comprising directing the probe pulse transmitted by the scene to a first 4f imaging system and second 4f imaging system, the probe pulse being first imaged by the first dispersive 4f imaging system, yielding a first spectral dispersion shearing temporal information that is contained in wavelengths to different positions for spatial encoder by an encoder; and the second dispersive 4f imaging system achieving a second spectral shearing in a reverse direction relative to the first dispersive 4f imaging system, in a symmetrical configuration of the first and the second dispersive 4f imaging, yielding first and second spectral dispersion shearing temporal information that is contained in wavelengths, respectively, to different positions for spatial encoder.

7. The method of claim 1, comprising:
time-spectrum mapping (M) when the single chirped pulse probes the dynamic scene;
storing temporal information at different wavelengths; a first spectral shearing (S) of the dynamics scene;
spatial encoder (C);
a second spectral shearing in a reverse direction (S');
spatiotemporal integration of a resulting spatially encoded dynamic scene on a camera, by spatially integrating over each pixel and temporally integrating over exposure time (T);
linking the captured snapshot E[m,n] with transmittance modulated by the dynamic scene a(x,y,t) as follows: E[m,n]=O a(x,y,t), where m and n are pixel indices of the camera and operator O=TS'CSM; and
reconstruction of the image from the captured snapshot E[m,n].

8. A system for imaging of a dynamic scene, comprising:
a laser source configured to emit a linearly chirped laser probe pulse;
an imaging unit;
a shearing and reversing shearing unit;
an encoder;
a detector; and
a computer;
wherein the imaging unit is configured to record the linearly chirped laser probe pulse transmitted by the dynamic scene in a snapshot; the shearing and reversing shearing unit is configured to spectrally shear the linearly chirped laser pulses received from said imaging unit to different positions of the encoder, the detector records a compressed snapshot of a temporal information of the dynamic scene read out by the probe pulse; and the computer processes the snapshot and yields a (x,y,t) datacube of the dynamic scene;
wherein the imaging unit comprises a first dispersive 4f imaging system and a second dispersive 4f imaging system, the laser probe pulse transmitted by the dynamic scene being first imaged by the first dispersive 4f imaging system, yielding a first spectral dispersion shearing temporal information that is contained in wavelengths to different positions for spatial encoder by the encoder; and said second dispersive 4f imaging system achieves a second spectral shearing in a reverse direction relative to the first dispersive 4f imaging system, in a symmetrical configuration of the first and the second dispersive 4f imaging, yielding first and second spectral dispersion shearing temporal information that is contained in wavelengths, respectively, to different positions for spatial encoder by the encoder, the detector recording a compressed snapshot of a temporal information of the dynamic scene, which is read out by the laser probe pulse; the recorded snapshot being processed by the computer to retrieve a (x,y,t) datacube of the dynamic scene.

9. The system of claim 8, wherein said shearing and reversing shearing unit comprises a first grating and a second grating.

10. The system of claim 8, wherein the imaging unit is an objective lens.

11. The system of claim 8, wherein the encoder is one of a static pseudo-random binary transmissive mask and an optimized mask.

12. The system of claim 8, wherein the encoder is a static coded aperture.

13. The system of claim 8, wherein the encoder is one of a pseudo-random binary transmissive mask and an optimized mask.

14. The system of claim 8, wherein said detector is a charge-coupled device (CCD) camera.

15. The system of claim 8, wherein said detector is a complementary metal-oxide-semiconductor (CMOS) camera.

* * * * *